(12) United States Patent
Watt, II et al.

(10) Patent No.: US 8,015,103 B2
(45) Date of Patent: Sep. 6, 2011

(54) AUCTION WITH INTEREST RATE BIDDING

(75) Inventors: William R. Watt, II, Chelmsford, MA (US); Matthew F. Ackley, Rowley, MA (US); William J. Cornell, Boston, MA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 12/710,294

(22) Filed: Feb. 22, 2010

(65) Prior Publication Data
US 2010/0257087 A1     Oct. 7, 2010

Related U.S. Application Data

(63) Continuation of application No. 10/733,700, filed on Dec. 11, 2003, now Pat. No. 7,783,555.

(51) Int. Cl.
*G06Q 40/00*     (2006.01)
(52) U.S. Cl. ............................................ 705/37; 705/35
(58) Field of Classification Search .................. 705/37
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,071,697 A | 1/1978 | Bushnell |
| 4,319,336 A | 3/1982 | Anderson et al. |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,845,625 A | 7/1989 | Stannard |
| 4,864,516 A | 9/1989 | Gaither et al. |
| 4,903,201 A | 2/1990 | Wagner |
| 4,974,252 A | 11/1990 | Osborne |
| 4,992,940 A | 2/1991 | Dworkin |
| 5,047,959 A | 9/1991 | Phillips et al. |
| 5,063,507 A | 11/1991 | Lindsey et al. |

(Continued)

FOREIGN PATENT DOCUMENTS

FR     2658635     8/1991

(Continued)

OTHER PUBLICATIONS

"U.S. Appl. No. 08/624,259, Non-Final Office Action mailed Jan. 6, 1999", 5 pgs.

(Continued)

*Primary Examiner* — James A Kramer
*Assistant Examiner* — James A Vezeris
(74) *Attorney, Agent, or Firm* — Schwegman, Lundberg & Woessner, P.A.

(57) ABSTRACT

A method and system are provides for an auction with interest rate bidding. The system receives a starting interest rate and a maximum interest rate for an interest-paying (IP) item at a computer. The system publishes the IP item for sale at the starting interest rate, initiates a declining auction and receives bids in the declining auction for the IP item. The system terminates the declining auction based on a predetermined period of time and identifies one or more bids that respectively include an interest rate that is lower than the maximum interest rate. Finally, the system selects a lowest interest rate bid from the one or more bids as a winning bid.

19 Claims, 9 Drawing Sheets

U.S. PATENT DOCUMENTS

| | | |
|---|---|---|
| 5,077,665 A | 12/1991 | Silverman et al. |
| 5,101,353 A | 3/1992 | Lupien et al. |
| 5,136,501 A | 8/1992 | Silverman et al. |
| 5,146,403 A | 9/1992 | Goodman |
| 5,168,446 A | 12/1992 | Wiseman |
| 5,205,200 A | 4/1993 | Wright |
| 5,222,236 A | 6/1993 | Potash et al. |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,310,997 A | 5/1994 | Roach et al. |
| 5,317,683 A | 5/1994 | Hager et al. |
| 5,325,297 A | 6/1994 | Bird et al. |
| 5,329,589 A | 7/1994 | Fraser et al. |
| 5,369,763 A | 11/1994 | Biles |
| 5,375,055 A | 12/1994 | Togher et al. |
| 5,394,324 A | 2/1995 | Clearwater |
| 5,426,281 A | 6/1995 | Abecassis |
| 5,428,778 A | 6/1995 | Brookes |
| 5,485,510 A | 1/1996 | Colbert |
| 5,553,145 A | 9/1996 | Micali |
| 5,557,728 A | 9/1996 | Garrett et al. |
| 5,598,557 A | 1/1997 | Doner et al. |
| 5,629,982 A | 5/1997 | Micali |
| 5,640,569 A | 6/1997 | Miller et al. |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,727,165 A | 3/1998 | Ordish et al. |
| 5,761,655 A | 6/1998 | Hoffman |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,848,139 A | 12/1998 | Grover |
| 5,850,442 A | 12/1998 | Muftic |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,975 A * | 5/1999 | Ausubel ................... 705/37 |
| 5,922,074 A | 7/1999 | Richard et al. |
| 5,963,915 A | 10/1999 | Kirsch |
| 6,006,201 A | 12/1999 | Berent et al. |
| 6,026,383 A | 2/2000 | Ausubel |
| 6,034,652 A | 3/2000 | Freiberger et al. |
| 6,035,402 A | 3/2000 | Vaeth et al. |
| 6,047,264 A | 4/2000 | Fisher et al. |
| 6,058,379 A | 5/2000 | Odom et al. |
| 6,085,176 A | 7/2000 | Woolston |
| 6,104,815 A | 8/2000 | Alcorn et al. |
| 6,119,137 A | 9/2000 | Smith et al. |
| 6,161,099 A * | 12/2000 | Harrington et al. ......... 705/36 R |
| 6,178,408 B1 | 1/2001 | Copple et al. |
| 6,192,407 B1 | 2/2001 | Smith et al. |
| 6,202,051 B1 | 3/2001 | Woolston |
| 6,243,691 B1 | 6/2001 | Fisher et al. |
| 6,266,651 B1 | 7/2001 | Woolston |
| 6,266,652 B1 | 7/2001 | Godin et al. |
| 6,338,050 B1 | 1/2002 | Conklin et al. |
| 6,415,270 B1 | 7/2002 | Rackson et al. |
| 6,430,545 B1 | 8/2002 | Honarvar et al. |
| 6,449,601 B1 | 9/2002 | Friedland et al. |
| 6,499,018 B1 | 12/2002 | Alaia et al. |
| 6,609,112 B1 | 8/2003 | Boarman et al. |
| 6,691,094 B1 | 2/2004 | Herschkorn |
| 6,871,190 B1 | 3/2005 | Seymour et al. |
| 7,003,485 B1 | 2/2006 | Young |
| 7,133,835 B1 | 11/2006 | Fusz et al. |
| 7,395,238 B2 | 7/2008 | Alaia et al. |
| 7,461,022 B1 | 12/2008 | Churchill et al. |
| 7,783,555 B2 | 8/2010 | Watt, II et al. |
| 7,853,486 B2 | 12/2010 | Grove et al. |
| 7,870,055 B2 | 1/2011 | Fisher et al. |
| 7,904,346 B2 | 3/2011 | Grove et al. |
| 2001/0027436 A1 | 10/2001 | Tenembaum |
| 2001/0032175 A1 | 10/2001 | Holden et al. |
| 2001/0037278 A1 | 11/2001 | Messmer et al. |
| 2001/0044771 A1 | 11/2001 | Usher et al. |
| 2002/0091629 A1 | 7/2002 | Danpour |
| 2002/0161691 A1 | 10/2002 | Nishi |
| 2002/0169710 A1 | 11/2002 | Morimoto |
| 2002/0198814 A1 | 12/2002 | Bansal |
| 2003/0093357 A1 | 5/2003 | Guler et al. |
| 2003/0204465 A1 | 10/2003 | Marhafer et al. |
| 2003/0208408 A1 | 11/2003 | Garg et al. |
| 2003/0236739 A1 | 12/2003 | Borgeson et al. |
| 2004/0128224 A1 | 7/2004 | Dabney et al. |
| 2005/0022115 A1 | 1/2005 | Baumgartner et al. |
| 2005/0033648 A1 * | 2/2005 | Jin et al. .................... 705/26 |
| 2005/0131809 A1 | 6/2005 | Watt, II et al. |
| 2007/0106571 A1 | 5/2007 | Grove et al. |
| 2007/0112644 A1 | 5/2007 | Grove et al. |
| 2008/0097896 A1 | 4/2008 | Fisher et al. |
| 2008/0103938 A1 | 5/2008 | Fisher et al. |

FOREIGN PATENT DOCUMENTS

| | | |
|---|---|---|
| NL | 9300266 | 2/1993 |
| TW | 0482969 | 4/2002 |
| TW | 0484078 | 4/2002 |
| TW | 0544609 | 8/2003 |
| WO | WO-9215174 A1 | 9/1992 |
| WO | WO-9634356 A1 | 10/1996 |
| WO | WO-9737315 A1 | 10/1997 |
| WO | WO-9918510 A1 | 8/1999 |
| WO | WO-9963461 A1 | 12/1999 |
| WO | WO-0034899 A1 | 6/2000 |
| WO | WO-0032088 A1 | 11/2000 |
| WO | WO-03038723 A1 | 5/2003 |
| WO | WO-2005059686 A2 | 6/2005 |
| WO | WO-2005059686 A3 | 6/2005 |

OTHER PUBLICATIONS

"U.S. Appl. No. 08/624,259, Non-Final Office Action mailed May 19, 1998", 6 pgs.

"U.S. Appl. No. 08/624,259, Non-Final Office Action mailed Nov. 30, 1999", 10 pgs.

"U.S. Appl. No. 08/624,259, Notice of Allowance mailed Mar. 26, 1999", 7 pgs.

"U.S. Appl. No. 08/624,259, Notice of Allowance mailed Jul. 6, 2000", 6 pgs.

"U.S. Appl. No. 08/624,259, Preliminary Amendment filed Aug. 8, 1996", 2 pgs.

"U.S. Appl. No. 08/624,259, Preliminary Amendment filed Sep. 10, 1999", 30 pgs.

"U.S. Appl. No. 08/624,259, Response filed Jan. 29, 1999 to Non-Final Office Action mailed Jan. 6, 1999", 2 pgs.

"U.S. Appl. No. 08/624,259, Response filed Feb. 23, 1999 to Non-Final Office Action mailed Jan. 25, 1999", 2 pgs.

"U.S. Appl. No. 08/624,259, Response filed Apr. 27, 2000 to Non-Final Office Action mailed Nov. 30, 1999", 7 pgs.

"U.S. Appl. No. 08/624,259, Response filed Aug. 19, 1998 to Non-Final Office Action mailed May 19, 1998", 6 pgs.

"U.S. Appl. No. 09/504,261, Advisory Action mailed Sep. 5, 2003", 3 pgs.

"U.S. Appl. No. 09/504,261, Appeal Brief filed Nov. 13, 2003", 15 pgs.

"U.S. Appl. No. 09/504,261, Examiner Interview Summary mailed Jul. 6, 2006", 6 pgs.

"U.S. Appl. No. 09/504,261, Examiner's Answer to Appeal Brief mailed Jan. 27, 2004", 11 pgs.

"U.S. Appl. No. 09/504,261, Final Office Action mailed Jun. 23, 2003", 7 pgs.
"U.S. Appl. No. 09/504,261, Final Office Action mailed Nov. 27, 2009", 12 pgs.
"U.S. Appl. No. 09/504,261, Non Final Office Action mailed Feb. 26, 2003", 7 pgs.
"U.S. Appl. No. 09/504,261, Non Final Office Action mailed Apr. 16, 2009", 8 pgs.
"U.S. Appl. No. 09/504,261, Non Final Office Action mailed Sep. 25, 2002", 5 pgs.
"U.S. Appl. No. 09/504,261, Pre-Appeal Brief Request filed Mar. 29, 2010", 5 pgs.
"U.S. Appl. No. 09/504,261, Response filed Jan. 23, 2003 to Non Final Office Action mailed Sep. 25, 2002", 22 pgs.
"U.S. Appl. No. 09/504,261, Response filed Jul. 16, 2009 to Non Final Office Action mailed Apr. 16, 2009", 10 pgs.
"U.S. Appl. No. 09/504,261, Response filed Aug. 19, 2003 to Final Office Action mailed Jun. 23, 2003", 13 pgs.
"U.S. Appl. No. 09/706,849, Examiner Interview Summary mailed May 28, 2009", 2 pgs.
"U.S. Appl. No. 09/706,849, Final Office Action mailed Mar. 1, 2010", 12 pgs.
"U.S. Appl. No. 09/706,849, Final Office Action mailed Aug. 6, 2008", 10 pgs.
"U.S. Appl. No. 09/706,849, Final Office Action mailed Nov. 23, 2007", 8 pgs.
"U.S. Appl. No. 09/706,849, Non Final Office Action mailed Apr. 7, 2009", 13 pgs.
"U.S. Appl. No. 09/706,849, Non Final Office Action mailed May 1, 2007", 8 pgs.
"U.S. Appl. No. 09/706,849, Non Final Office Action mailed Jul. 18, 2005", 7 pgs.
"U.S. Appl. No. 09/706,849, Non Final Office Action mailed Oct. 12, 2004", 11 pgs.
"U.S. Appl. No. 09/706,849, Non Final Office Action mailed Nov. 28, 2006", 6 pgs.
"U.S. Appl. No. 09/706,849, Non-Final Office Action mailed Jun. 5, 2009", 13 pgs.
"U.S. Appl. No. 09/706,849, Preliminary Amendment mailed Jan. 12, 2001", 14 pgs.
"U.S. Appl. No. 09/706,849, Response filed Jan. 11, 2005 to Non Final Office Action mailed Oct. 22, 2004", 11 pgs.
"U.S. Appl. No. 09/706,849, Response filed Jan. 18, 2006 to Non Final Office Action mailed Jul. 18, 2005", 12 pgs.
"U.S. Appl. No. 09/706,849, Response filed Feb. 5, 2007 to Non Final Office Action mailed Nov. 28, 2006", 10 pgs.
"U.S. Appl. No. 09/706,849, Response filed Feb. 6, 2009 to Final Office Action mailed Aug. 6, 2008", 17 pgs.
"U.S. Appl. No. 09/706,849, Response filed May 23, 2008 to Final Office Action mailed Nov. 23, 2007", 16 pgs.
"U.S. Appl. No. 09/706,849, Response filed Oct. 24, 2007 to Non-Final Office Action mailed May 1, 2007", 16 pgs.
"U.S. Appl. No. 09/706,849, Response filed Dec. 7, 2009 to Non Final Office Action mailed Jun. 16, 2009", 14 pgs.
"U.S. Appl. No. 09/820,574, 312 Amendment filed Dec. 20, 2006", 8 pgs.
"U.S. Appl. No. 09/820,574, Advisory Action mailed Mar. 20, 2006", 2 pgs.
"U.S. Appl. No. 09/820,574, Appeal Brief filed May 4, 2006", 21 pgs.
"U.S. Appl. No. 09/820,574, Final Office Action mailed Jan. 4, 2006", 18 pgs.
"U.S. Appl. No. 09/820,574, Non-Final Office Action mailed Jun. 27, 2005", 19 pgs.
"U.S. Appl. No. 09/820,574, Notice of Allowance mailed Apr. 12, 2007", 11 pgs.
"U.S. Appl. No. 09/820,574, Notice of Allowance mailed Oct. 4, 2007", 8 pgs.
"U.S. Appl. No. 09/820,574, Response filed Mar. 6, 2006 to Final Office Action mailed Jan. 4, 2006", 6 pgs.
"U.S. Appl. No. 09/820,574, Response filed Jul. 11, 2007 to Notice of Allowance mailed Apr. 12, 2007", 7 pgs.
"U.S. Appl. No. 09/820,574, Response filed Nov. 2, 2005 to Non-Final Office Action mailed Jun. 27, 2005", 14 pgs.
"U.S. Appl. No. 10/316,292, Final Office Action mailed Dec. 17, 2009", 5 pgs.
"U.S. Appl. No. 10/316,292, Non Final Office Action mailed Jan. 18, 2007", 4 pgs.
"U.S. Appl. No. 10/316,292, Non-Final Office Action mailed Feb. 7, 2008", 4 pgs.
"U.S. Appl. No. 10/316,292, Non-Final Office Action mailed Sep. 9, 2008", 4 pgs.
"U.S. Appl. No. 10/316,292, Response filed Mar. 9, 2009 to Non-Final Office Action mailed Sep. 9, 2008", 10 pgs.
"U.S. Appl. No. 10/316,292, Response filed Mar. 17, 2010 to Final Office Action mailed Dec. 17, 2009", 9 pgs.
"U.S. Appl. No. 10/316,292, Response filed Apr. 18, 2007 to Non Final Office Action mailed Jan. 18, 2007", 12 pgs.
"U.S. Appl. No. 10/316,292, Response filed May 2, 2008 to Non-Final Office action mailed Feb. 7, 2008", 10 pgs.
"U.S. Appl. No. 10/316,292, Response filed Oct. 31, 2007 to Restriction Requirement mailed Aug. 1, 2007", 8 pgs.
"U.S. Appl. No. 10/316,292, Restriction Requirement mailed Aug. 1, 2007", 6 pgs.
"Application U.S. Appl. No. 10/316,293, Examiner Interview Summary mailed Aug. 10, 2007", 2 pgs.
"U.S. Appl. No. 10/316,293, Final Office Action mailed Jan. 31, 2008", 12 pgs.
"U.S. Appl. No. 10/316,293, Non-Final Office Action mailed May 24, 2007", 9 pgs.
"U.S. Appl. No. 10/316,293, Non-Final Office Action mailed Aug. 11, 2008", 17 pgs.
"U.S. Appl. No. 10/316,293, Preliminary Amendment filed Apr. 28, 2005", 3 pgs.
"U.S. Appl. No. 10/316,293, Response filed Feb. 11, 2009 to Non-Final Office Action mailed Aug. 11, 2008", 11 pgs.
"U.S. Appl. No. 10/316,293, Response filed Jun. 30, 2008 to Final Office Action mailed Jan. 31, 2008", 16 pgs.
"U.S. Appl. No. 10/316,293, Response filed Nov. 7, 2007 to Non-Final Office Action mailed May 24, 2007", 16 pgs.
"U.S. Appl. No. 10/316,296, Advisory Action mailed Mar. 26, 2010", 3 pgs.
"U.S. Appl. No. 10/316,296, Examiner Interview Summary mailed Apr. 1, 2010", 3 pgs.
"U.S. Appl. No. 10/316,296, Final Office Action mailed Jan. 11, 2010", 17 pgs.
"U.S. Appl. No. 10/316,296, Final Office Action mailed Oct. 30, 2007", 16 pgs.
"U.S. Appl. No. 10/316,296, Non Final Office Action mailed Jun. 4, 2007", 16 pgs.
"U.S. Appl. No. 10/316,296, Non-Final Office Action mailed Jul. 11, 2008", 16 pgs.
"U.S. Appl. No. 10/316,296, Preliminary Amendment filed Apr. 28, 2005", 3 pgs.
"U.S. Appl. No. 10/316,296, Response filed Jan. 12, 2009 to Non-Final Office Action mailed Jul. 11, 2008", 19 pgs.
"U.S. Appl. No. 10/316,296, Response filed Mar. 11, 2010 to Final Office Action mailed Jan. 11, 2010", 19 pgs.
"U.S. Appl. No. 10/316,296, Response filed Apr. 30, 2008 to Final Office Action mailed Oct. 30, 2007", 24 pgs.
"U.S. Appl. No. 10/316,296, Response filed Oct. 4, 2007 to Non-Final Office Action mailed Jun. 4, 2007", 19 pgs.
"U.S. Appl. No. 10/316,297, Final Office Action mailed Aug. 7, 2008", 17 pgs.
"U.S. Appl. No. 10/316,297, Final Office Action mailed Oct. 17, 2007", 13 pgs.
"U.S. Appl. No. 10/316,297, Non-Final Office Action mailed May 16, 2007", 11 pgs.
"U.S. Appl. No. 10/316,297, Non-Final Office Action mailed Dec. 11, 2007", 21 pgs.
"U.S. Appl. No. 10/316,297, Preliminary Amendment filed Apr. 28, 2005", 3 pgs.
"U.S. Appl. No. 10/316,297, Response filed Feb. 9, 2009 to Final Office Action mailed Aug. 7, 2008", 13 pgs.
"U.S. Appl. No. 10/316,297, Response filed May 2, 2008 to Non-Final Office Action mailed Dec. 11, 2007", 15 pgs.

"U.S. Appl. No. 10/316,297, Response filed Aug. 14, 2007 to Non-Final Office Action mailed May 6, 2007", 13 pgs.
"U.S. Appl. No. 10/316,297, Response filed Oct. 31, 2007 to Final Office Action mailed Oct. 17, 2007", 15 pgs.
"U.S. Appl. No. 10/316,298, Final Office Action mailed Feb. 7, 2008", 5 pgs.
"U.S. Appl. No. 10/316,298, Final Office Action mailed Jun. 11, 2009", 5 pgs.
"U.S. Appl. No. 10/316,298, Non-Final Office Action mailed Feb. 9, 2007", 5 pgs.
"U.S. Appl. No. 10/316,298, Non-Final Office Action mailed Aug. 20, 2007", 4 pgs.
"U.S. Appl. No. 10/316,298, Non-Final Office Action mailed Oct. 3, 2008", 5 pgs.
"U.S. Appl. No. 10/316,298, Preliminary Amendment mailed Apr. 28, 2005", 3 pgs.
"U.S. Appl. No. 10/316,298, Response filed Mar. 3, 2009 to Non-Final Office Action mailed Oct. 3, 2008", 15 pgs.
"U.S. Appl. No. 10/316,298, Response filed May 4, 2007 to Non-Final Office Action mailed Feb. 9, 2007", 10 pgs.
"U.S. Appl. No. 10/316,298, Response filed Jul. 7, 2008 to Final Office Action mailed Feb. 7, 2008", 11 pgs.
"U.S. Appl. No. 10/316,298, Response filed Oct. 31, 2007 to Non-Final Office Action mailed Aug. 20, 2007", 10 pgs.
"U.S. Appl. No. 10/316,298, Response filed Dec. 11, 2009 to Final Office Action mailed Jun. 11, 2009", 10 pgs.
"U.S. Appl. No. 10/316,298, Restriction Requirement mailed Aug. 1, 2007", 7 pgs.
"U.S. Appl. No. 10/316,324, Advisory Action mailed Sep. 5, 2008", 3 pgs.
"U.S. Appl. No. 10/316,324, Examiner Interview Summary mailed May 28, 2009", 2 pgs.
"U.S. Appl. No. 10/316,324, Final Office Action mailed Jun. 11, 2008", 7 pgs.
"U.S. Appl. No. 10/316,324, Non-Final Office Action mailed Jun. 5, 2009", 22 pgs.
"U.S. Appl. No. 10/316,324, Non-Final Office Action mailed Mar. 3, 2009", 7 pgs.
"U.S. Appl. No. 10/316,324, Non-Final Office Action mailed Oct. 30, 2007", 6 pgs.
"U.S. Appl. No. 10/316,324, Notice of Allowance mailed Mar. 9, 2010", 8 pgs.
"U.S. Appl. No. 10/316,324, Preliminary Amendment filed Apr. 28, 2005", 3 pgs.
"U.S. Appl. No. 10/316,324, Response filed Apr. 30, 2008 to Non-Final Office Action mailed Oct. 30, 2007", 10 pgs.
"U.S. Appl. No. 10/316,324, Response filed Aug. 8, 2008 to Final Office Action mailed Jun. 11, 2008", 11 pgs.
"U.S. Appl. No. 10/316,324, Response filed Dec. 7, 2009 to Non Final Office Action mailed Jun. 16, 2009", 9 pgs.
"U.S. Appl. No. 10/316,325, Final Office Action mailed Feb. 22, 2010", 31 pgs.
"U.S. Appl. No. 10/316,325, Final Office Action mailed Oct. 30, 2007", 19 pgs.
"U.S. Appl. No. 10/316,325, Non Final Office Action mailed Jun. 11, 2007", 20 pgs.
"U.S. Appl. No. 10/316,325, Non-Final Office Action mailed Jun. 27, 2008", 18 pgs.
"U.S. Appl. No. 10/316,325, Preliminary Amendment filed Apr. 28, 2005", 3 pgs.
"U.S. Appl. No. 10/316,325, Response filed Apr. 30, 2008 to Final Office Action mailed Oct. 30, 2007", 23 pgs.
"U.S. Appl. No. 10/316,325, Response filed Oct. 11, 2007 to Non-Final Office Action mailed Jun. 11, 2007", 16 pgs.
"U.S. Appl. No. 10/316,325, Response filed Dec. 29, 2008 to Non Final Office Action mailed Jun. 27, 2008", 17 pgs.
"U.S. Appl. No. 10/316,326, Examiner Interview Summary mailed May 29, 2009", 2 pgs.
"U.S. Appl. No. 10/316,326, Final Office Action mailed Feb. 19, 2010", 11 pgs.
"U.S. Appl. No. 10/316,326, Final Office Action mailed Jun. 25, 2008", 8 pgs.
"U.S. Appl. No. 10/316,326, Non-Final Office Action mailed Apr. 3, 2009", 32 pgs.
"U.S. Appl. No. 10/316,326, Non-Final Office Action mailed Jun. 3, 2009", 12 pgs.
"U.S. Appl. No. 10/316,326, Non-Final Office Action mailed Oct. 30, 2007", 6 pgs.
"U.S. Appl. No. 10/316,326, Preliminary Amendment mailed Apr. 28, 2005", 3 pgs.
"U.S. Appl. No. 10/316,326, Response filed Apr. 30, 2008 to Non-Final Office Action mailed Oct. 30, 2007", 12 pgs.
"U.S. Appl. No. 10/316,326, Response filed Dec. 3, 2009 to Non Final Office Action mailed Jun. 4, 2009", 14 pgs.
"U.S. Appl. No. 10/316,326, Response filed Dec. 29, 2008 to Final Office Action mailed Jun. 25, 2008", 16 pgs.
"U.S. Appl. No. 10/318,676, Examiner Interview Summary mailed Apr. 14, 2010", 3 pgs.
"U.S. Appl. No. 10/318,676, Examiner Interview Summary mailed Oct. 30, 2007", 2 pgs.
"U.S. Appl. No. 10/318,676, Final Office Action mailed Oct. 30, 2007", 18 pgs.
"U.S. Appl. No. 10/318,676, Non Final Office Action mailed Jun. 4, 2007", 17 pgs.
"U.S. Appl. No. 10/318,676, Non-Final Office Action mailed Jun. 26, 2008", 15 pgs.
"U.S. Appl. No. 10/318,676, Preliminary Amendment filed Apr. 28, 2005", 3 pgs.
"U.S. Appl. No. 10/318,676, Response filed Apr. 30, 2008 to Final Office Action mailed Oct. 30, 2007", 15 pgs.
"U.S. Appl. No. 10/318,676, Response filed Oct. 9, 2007 to Non-Final Office Action mailed Jun. 4, 2007", 17 pgs.
"U.S. Appl. No. 10/318,676, Response filed Dec. 29, 2008 to Non Final Office Action mailed Jun. 26, 2008", 17 pgs.
"U.S. Appl. No. 10/319,868, Non-Final Office Action mailed Oct. 30, 2007", 8 pgs.
"U.S. Appl. No. 10/319,868, Preliminary Amendment filed Apr. 28, 2005", 3 pgs.
"U.S. Appl. No. 10/319,869, Final-Office Action mailed Oct. 30, 2007", 5 pgs.
"U.S. Appl. No. 10/319,869, Non-Final Office Action mailed Jul. 16, 2007", 6 pgs.
"U.S. Appl. No. 10/319,869, Preliminary Amendment filed Apr. 28, 2005", 3 pgs.
"U.S. Appl. No. 10/319,869, Response filed Oct. 16, 2007 to Non-Final Office Action mailed Jul. 16, 2007", 9 pgs.
"U.S. Appl. No. 10/733,700, Advisory Action mailed Sep. 9, 2008", 3 pgs.
"U.S. Appl. No. 10/733,700, Final Office Action mailed Jun. 25, 2008", 22 pgs.
"U.S. Appl. No. 10/733,700, Non-Final Office Action mailed Jun. 10, 2009", 14 pgs.
"U.S. Appl. No. 10/733,700, Non-Final Office Action mailed Dec. 6, 2007", 30 pgs.
"U.S. Appl. No. 10/733,700, Notice of Allowance mailed Jan. 29, 2010", 17 pgs.
"U.S. Appl. No. 10/733,700, Response filed Mar. 6, 2008 to Non-Final Office Action mailed Dec. 6, 2007", 23 pgs.
"U.S. Appl. No. 10/733,700, Response filed Apr. 16, 2009 to Restriction Requirement mailed Mar. 19, 2009", 13 pgs.
"U.S. Appl. No. 10/733,700, Response filed Aug. 25, 2008 to Final Office Action mailed Jun. 25, 208", 25 pgs.
"U.S. Appl. No. 10/733,700, Response filed Sep. 10, 2009 to Non Final Office Action mailed Jun. 10, 2009", 15 pgs.
"U.S. Appl. No. 10/733,700, Restriction Requirement mailed Mar. 19, 2009", 8 pgs.
"U.S. Appl. No. 10/749,628, Final Office Action mailed Jan. 10, 2008", 8 pgs.
"U.S. Appl. No. 10/749,628, Non Final Office Action mailed Jul. 6, 2007", 6 pgs.
"U.S. Appl. No. 10/749,628, Non-Final Office Action mailed Jul. 8, 2008", 13 pgs.
"U.S. Appl. No. 10/749,628, Non-Final Office Action mailed Dec. 18, 2008", 27 pgs.

"U.S. Appl. No. 10/749,628, Notice of Allowance mailed May 15, 2009", 24 pgs.
"U.S. Appl. No. 10/749,628, Response filed Mar. 18, 2009 to Non-Final Office Action mailed Dec. 18, 2008", 11 pgs.
"U.S. Appl. No. 10/749,628, Response filed Mar. 27, 2008 to Final Office Action mailed Oct. 11, 2007", 16 pgs.
"U.S. Appl. No. 10/749,628, Response filed Oct. 8, 2008 to Non-Final Office Action mailed Jul. 8, 2008", 13 pgs.
"U.S. Appl. No. 10/749,628, Response filed Oct. 11, 2007 to Non-Final Office Action mailed Jul. 6, 2007", 15 pgs.
"U.S. Appl. No. 10/750,052, Advisory Action mailed Sep. 17, 2007", 3 pgs.
"U.S. Appl. No. 10/750,052, Appeal Brief filed Jan. 4, 2008", 25 pgs.
"U.S. Appl. No. 10/750,052, Final Office Action mailed Jun. 26, 2007", 8 pgs.
"U.S. Appl. No. 10/750,052, Non Final Office Action mailed Dec. 22, 2006", 10 pgs.
"U.S. Appl. No. 10/750,052, Pre-Appeal Brief Request filed Sep. 26, 2007", 5 pgs.
"U.S. Appl. No. 10/750,052, Reply Brief filed Apr. 8, 2008", 13 pgs.
"U.S. Appl. No. 10/750,052, Response filed Mar. 22, 2007 to Non Final Office Action mailed Dec. 22, 2006", 13 pgs.
"U.S. Appl. No. 10/750,052, Response filed Aug. 27, 2007 to Final Office Action mailed Jun. 26, 2007", 11 pgs.
"U.S. Appl. No. 10/750,052, Response filed Sep. 19, 2006 to Restriction Requirement mailed Aug. 2, 2006", 8 pgs.
"U.S. Appl. No. 10/750,052, Restriction Requirement mailed Aug. 2, 2006", 7 pgs.
"U.S. Appl. No. 11/167,999, Non-Final Office Action mailed Dec. 13, 2007", 16 pgs.
"U.S. Appl. No. 11/167,999, Response filed Mar. 4, 2008 to Non-Final Office Action mailed Dec. 13, 2007", 14 pgs.
"U.S. Appl. No. 11/618,632, Final Office Action Mailed Oct. 30, 2009", 19 pgs.
"U.S. Appl. No. 11/618,632, Non-Final Office Action mailed Dec. 24, 2008", 10 pgs.
"U.S. Appl. No. 11/618,632, Pre-Appeal Brief Request filed Mar. 1, 2010", 4 pgs.
"U.S. Appl. No. 11/618,632, Response filed Jun. 24, 2009 to Non Final Office Action mailed Dec. 24, 2008", 16 pgs.
"U.S. Appl. No. 11/648,213, Non Final Office Action mailed May 5, 2010", 9 pgs.
"U.S. Appl. No. 11/963,094, Non-Final Office Action mailed May 13, 2010", 8 pages.
"U.S. Appl. No. 11/963,130, Non-Final Office Action mailed May 13, 2010", 10 pgs.
"Autodaq Creates Online Marketplace for Used Auto Wire", *Business Wire*, (Jan. 17, 2000).
"Cassini Resource Exchange User's guide", *California Institute of Technology*, (Apr. 1993), 19 pgs.
"Daemon", [Online]. Retrieved from the Internet: <URL: http://www.webopedia.com/TERM/d/daemon.html>, (Jun. 2, 2004), 2 pgs.
"European Application Serial No. 04813781.4, Search Report mailed on Feb. 17, 2010", 3 pgs.
"First Auction Wins the Bid for Online", *Internet Shopping Network*, (Jan. 7, 2002), 4 pgs.
"How an Auction Works", [Online]. Retrieved from the Internet: <URL: http://web.archive.org/web/20030618083111/www.bidshares.com/help/index.cfm?fuseaction=info_howauctionworks>, (Jun. 2003), 3 pgs.
"Interactive Collector: Archive Catalogs", (Nov. 1994), 2 Pages.
"International Application Serial No. PCT/US03/41535, International Search Report mailed Oct. 5, 2004", 1 pg.
"International Application Serial No. PCT/US01/31012, International Search Report mailed Jan. 15, 2002", 7 pgs.
"International Application Serial No. PCT/US03/41535, International Preliminary Examination Report mailed May 26, 2005", 4 pgs.
"International Application Serial No. PCT/US04/41517, International Search Report mailed Jun. 28, 2005", 4 pgs.
"International Application Serial No. PCT/US04/41517, Written Opinion mailed Jun. 28, 2005", 5 pgs.

"Internet-based Investor Service Completes Trials; Adds Mutual Funds to investment Offerings", *PR Newswire Association, Inc.,*, (Jan. 17, 1995), Section: Financial News, Chicago.
"Merchant Accounts and Key Management", *Open Market, Inc., Appendix E*, mailed to the USPTO Oct. 24, 1994, 13 pgs.
"Mosaic for X version 2.0 Fill-Out form Support", mosaic-x@ncsa.uiuc.edu, *Appendix B*, mailed to the USPTO Oct. 24, 1994, 9 pgs.
"NetBill 1994 Prototype", [Online]. Retrieved from the Internet: <URL: http://web.archive.org/web/19990203173052/www.netbill.com/>, 1 pg.
"New bidding rules to begin in FCC's auction of airwave", *Austin American Statesmen (Newspaper), Final Edition*, (Feb. 4, 1995), D.5.
"Onsale Joins Fray as Online Shopping Picks Up Speed: Internet Booms", *Computer Reseller News*, CMP Publications, Inc., USA, (Jun. 5, 1995), 1 pg.
"Onsale: Onsale Brings Thrill of Auctions and Bargain Hunting Online; Unique Internet retail service debuts with week-long charity auction for The Computer Museum in Boston", *Business Wire*, Dialog Web. 0489267 BW0022, (May 24, 1995), 3 pages.
"Taiwanese Application Serial No. 93138325, Office Action Mailed Feb. 3, 2010", 5 pgs.
"Taiwanese Application Serial No. 93138325, Office Action mailed May 10, 2006", 5 pgs.
"Taiwanese Application Serial No. 93138325, Office Action mailed Sep. 16, 2009", 20 pgs.
"What's new at eBay's Auction Web", *AuctionWeb What's New*, [Online]. Retrieved from the Internet: <URL: http://web.archive.org/web19981202085151/http://www.ebay.com/aw/update.html>, (May 18, 2005), 6 pgs.
Anand, R., "Research Report—The Electronic Flea Market", *Computer Science, RC* 19678 (87230), *IBM Research Division*, (Jul. 28, 1994), 1-18.
Anderson, Scott, et al., "The Efficiency of Experimental Asset Markets: Empirical Robustness and Subject Sophistication", *Research in Experimental Economics, The Journal of Economic Education*, transferred in, (Fall 1993), 107-190.
Ausubel, L. M, "An Efficient Ascending-Bid Auction for Multiple Objects", *The American Economic Review*, vol. 94, No. 5, (Dec. 2004), 1452-1475.
Banatre, J-P, "The Design and Building of Enchere, A Distributed Electronic Marketing System", *Communications of the Association for Computing Maiciner*, New York, NY, US. vol. 29 No. Jan. 1986, XP000002077, (Jan. 1986), 9-29.
Banatre, Michael, "Distributed Auction Bidding System", *Computer Communications*, vol. 4, No. 4, (Aug. 1981), 179-186.
Bikhchandani, S., et al., "The Economics of Treasury Securities Markets", *Journal of Economic Perspectives*, 7 (3),, Summer 1993, (1993), 177-134.
Brooker, Ellis, "Mega Real Estate Auction Counts on Imaging", *Computerworld*, (Dec. 7, 1982), 20.
Budish, Eric B, et al., "Buy Price in online auctions: irrationality on the internet?", *Economics Letters*, (2001), 325-333.
Bunker, Ted, "How Auction Technology Sped and Enhanced Sale of Radio Licenses", *Copyright 1995 Investor's Business Daily, Inc., Investor's Business Daily*, (Feb. 24, 1995), 3 pages.
Business Week, "Auctioning off Relics of the Computer Age", Business Week, (Apr. 11, 1994), 1 page.
Business Wire, Inc., "The Computer Museum Brings Auction Block to Cyberspace in First Internet Auction", Business Wire, Inc., (Mar. 14, 1994), 2 pages.
Clemons, E, "Evaluating the prospects for alternative electronic securities", *Proceedings of ICIS 91: 12th International Conference on Information Systems*, (Dec. 16-18, 1991), 53-61.
Cohen, Danny, "Electronic Commerce", *University of Southern California, Information Sciences Institute, ISI Research Report, ISI/RR-89-244*, (Oct. 1989), 1-19, 31-33.
Computer Literacy Book Bulletin, "First Internet Auction", Computer Literacy Book Bulletin, 1 page.
Computerworld, "Computer Museum hosts Internet Auction", Computerworld, (shares page with another reference), (Mar. 28, 1994), 1 page.

Computerworld, "Seventh Annual Intermac Users Group Education Symposium", Computerworld, (shares page with another reference), (Mar. 28, 1994), 1 page.

Court of Appeals for the Federal, "In re Schrader, 30 USPQ 2d, 1455-1462", *Court of Appeals for the Federal Circuit, claim 1 of application at issue cited at col. 2*, (Apr. 13, 1994), 1456-1462.

Cox, B., "NetBill Security and Transaction Protocol", *First USENIX Workshop on Electronic Commerce*, (1995), 77-88.

Davies, S. A, "Treasury action to 'go live' with computer tenders. (Treasury Automated Auction Processing System, or TAAPS)(Public Securities association supplement)", *Bond Buyer* v. *304, n2914*, (Apr. 29, 1993), 5 pgs.

Dyson, E., "Information, Bid and Asked", *Forbes*, vol. 146, Issue 4, (Aug. 20, 1990).

Edell, Richard, "Billing Users Pricing for TCP", *IEEE Journal on Selected Areas in Communications*, vol. 13, No. 7, (Sep. 1995), 1162-1175.

Fabozzi, F. J, et al., "", *The Handbook of Fixed Income Securities, Third Edition*, Business One Irwin, (1991), 173-187.

Forsythe, Robert, "The Iowa Presidential Stock Market: A Field Experiment", *Research in Experimental Economics*, vol. 4, ISBN: 0-89232-652-2, (1991), 1-43.

Franklin, Matthew, "The Design and Implementation of a Secure Auction Service", *1995 IEEE Symposium on Security and Privacy*, Oakland, California May 8-10, 1995, (1995), 2-14.

Graham, I, "The Emergence of Linked Fish Markets in Europe", *Focus Theme*, 1-3.

Graves, Robert, et al., "An Auction method for Course Registration", *Interfaces 23:5*, Sep. Oct. 1993, transferred in, (1993), 81-92.

Gupta, S., et al., "Temporary and Permanent Buyout Prices in Online Auctions", *Working Paper, MIT Sloan School of Management*, (May 23, 2005), 1-12.

Harrison Scott Publications, "Unusual Farmland Auction Set", *Liquidation Alert, Harrison Scott Publications, Inc.*, (Mar. 28, 1994), 2 pages.

Harvard Business School, "Aucnet: The Story Continues", *Harvard Business School 2-195-122*, (Jan. 17, 1995), 1 page.

Hauser, R, "Anonymous Delivery of Goods in Electronic Commerce", *IBM Technical Disclosure Bulletin*, 39(3), (Mar. 1996), 363-366.

Helinski, Paul, "Automating Web-Site Maintenance", *Part 2, Perl-based tools to manage your Web site, Web Techniques, ISSN 1086-556XP002048313.*, www.ddj.com/architect/184414429?pgno==3>, (Dec. 1996), 75-76, 78.

Heng-Wah, Choy, "Google Newsgroup RE: Electronic Stamp Auction", (Jun. 17, 1994), 1 page.

Hess, C M, et al., "Computerized Loan Organization System: An Industry Case Study of the Electronic Markets Hypothesis", *MIS Quarterly*, vol. 18(3), (Sep. 1994), 251-274.

Hidvegi, Zoltan, et al., "Buy-price English Auction", (Sep. 1, 2002), 28 Pages.

Jackson, Ed, "Too much commercial offers", *Google Groups*, (Mar. 13, 1996), 2 pages.

Johnson, et al., "Automated double oral auctions using IBM PC network", *Association for Computing Machinery, CSC '86 Cincinnati Proceedings*, (Feb. 1986), p. 507.

Johnson, Alonzo, "Multiple Unit Double Auction User's Manual", *Social Science Working Paper 676, Division of the Humanities and Social Sciences California Institute of Technology*, Jun. 1988, Revised Sep. 1989, 1-9.

Kaehler, Ted, "Betting, Bribery and Bankruptcy—A Simulated Economy that Learns to Predict", *IEEE Spring Compcon, Research Report*, (1989), 357-361.

Kaplan, S. J, "*Intermart*: the Virtual Shopper's Paradise", Intermart, (Dec. 7, 1994), 17 pgs.

Kelly, S, "Jury Still Out on Treasury's Dutch Experiment", New York, N.Y.: Apr. 29 vol. 304, Iss. 29141, (1993), 4 pgs.

Kelly, S., "Jury Still Out on Treasury's Dutch Experiment", *New Yourk*, N.Y.:vol. 304, *Iss 29141* ;, (Apr. 29, 1993), p. A.

Klein, S, "Introduction to Electronic Auctions", *Focus Theme*, 1-4.

Ledyard, J., et al., "Using Computerized Exchange Systems to Solve an Allocation Problem in Project Management", *California Institute of Technology*, (Nov. 1993).

Lee, H G, "AUCNET: Electronic Intermediary for Used-Car Transactions", *Focus Theme*, 1-5.

Lee, H. G, "Electronic brokerage and electronic auction: the impact of IT on market structures", *Proceedings of the Twenty-Ninth Hawaii International Conference on System Sciences*, vol. 4, (1996), 397-406.

Littlefair, T., "Homelink: a unique service", *Computer bulletin*, (Jun. 1986), 12-13.

Lucking-Reiley, David, "Auctions on the internet: What's being auctioned, and how?", *The journal of industrial economics*, vol. XLVIII, No. 3, (Sep. 2000), 227-252.

MacKinnon, Donna Jean, "Playing the Auction Game", *SU2 Edition, Toronto Star, Ontario*, p. E.1, (Oct. 4, 1987), 3 pages.

Malone, T., et al., "Electronic Markets and Electronic Hierarchies", *Communications of the ACM*, (Jun. 1987), vol. 14, Issue 25.

Mardesich, Jodi, "Site Offers Clearance for End-of-Life Products—Onsale Takes Auction Gavel Electronic", *Computer Reseller News*, (Jul. 8, 1996), 2 pps.

Maskery, Maryann, "Car auction reaches into space", *Automotive News, Dialog File 16, Accession No. 03482064*, (Nov. 25, 1991), 3 pgs.

Massimb, Marcel, "Electronic Trading, Market Structure and Liquidity", *Financial Analysts Journal*, 50(1), (Jan./Feb. 1994), 39-50.

Mathews, Timothy, "A Risk Averse Seller in a Continuous Time Auction with a Buyout Option", (Sep. 12, 2002), 26 Pages.

McAdams, D. L, "Essays in Multi-Unit Auction Theory", *Ph.D. Dissertation, Stanford University Graduate School of Business*, (May 2001), 95-126.

McCabe, Kevin, "Smart Computer-Assisted Markets", *Science*, vol. 254, transferred in, (Oct. 25, 1991), 534-538.

McCarthy, Gene, "The Electronic Auctioning of Servicing", *Mortgage Banking*, (Dec. 1994), 96-98.

McConkey, Carey, "Company Launches Reverse Auction Site", *The State News*, (Oct. 25, 1999), 3 pgs.

Meade, J., "Visual 360: A Performance Appraisal System That's 'Fun'", *HR Magazine*, Society for Human Resource Management., (Jul. 1999), 3 pgs.

Messmer, E., "Car Auctions Via Business TV to Debut Plans to launch as Online Used Car Auction Service", *Network World*, vol. 11, Iss.30, (Jul. 25, 1994), 1 pg.

Milgrom, Paul, "Putting Auctions Theory to work :The Simultaneous ascending Auction", *The Journal of Political Economy*, vol. 180, No. 2, (Apr. 2000), 245-272.

Neo, B S, "The implementation of an electronic market for pig trading in Singapore", *Journal of Strategic Information Systems*; vol. 1(5), (Dec. 1992), 278-288.

Oates, Sarah, "Rain Checks May Be Allowed", *Orlando Sentinel*, (07 13 88), 1 pg.

Obraczka, K., et al., "Internet Resource Discovery", (Sep. 1993), p. 8-22.

O'Dell, John, "Automobiles", *The Los Angeles Times copyright, The Times Mirror Company; Los Angeles Times 1994 All Rights Reserved*, (Aug. 23, 1994), 13-14.

Omidyar, P., "Google Newsgroup RE: AuctionWeb: Interactive Web Auction", (Sep. 12, 1995), 3 pgs.

PC Week, "Electronic Bonds Auction", *PC Week*, vol. 6, No. 22, (Jun. 5, 1989), 68.

Pope, Christina, "What Am I Bid? Check the Modem: Electronic Auctions Come to Real Estate", *The Greater Baton Rouge Business Report*, vol. 11, No. 26, (Jul. 27, 1993), 27.

Post, D L, et al., "Application of auctions as a pricing mechanism for the interchange of electric power", *IEEE Transactions on Power Systems*, 10(3), (Aug. 1995), 1580-1584.

Preist, Chris, et al., "Adaptive Agents in a Persistent Shout Double Auction", *International Conference on Information and Computation Economies, Proceedings of the first international conference on Information and computation economies*, (1999), 11-18.

Reck, M., "Formally Specifying an Automated Trade Execution Systems", *The Journal of Systems and Software, 1993*, Elsevier Science Publishing, USA, (1993), 245-252.

Reck, M., et al., "Types of Electronic Auctions", (1992), p. 236-243.

Reck, Martin, "Trading-Process Characteristics of Electronic Auctions", *Focus Theme*, 1-7.

Resnick, Paul, "Reputation systems", *Communications of the ACM*, 43(12), (Dec. 2000), 45-48.

Reynolds, Stanley S, et al., "Ascending Bid Auctions with a Buy-Now Price", (Aug. 2002), 29 Pages.

Rockoff, T E, et al., "Design of an Internet-based system for remote Dutch auctions", *Internet Research: Electronic Networking Applications and Policy*, vol. 5(4), (Jan. 1, 1995), 10-16.

Saeki, Motoshi, "Supporting Distributed Individual Work in Cooperative Specification Development", *Dept. of Computer Science, Tokyo Institute of Technology*, (Nov. 15, 1995), 232-247.

Sammer, Harald, "Online Stock Trading Systems: Study of an Application", *IEEE Spring Compcon*, (Spring 1987), 161-162.

Saunders, Barbara, "Final Gas 'De-vintaging' Rule Contains 2 Major Changes for Negotiations", *Oil Daily*, (Jun. 10, 1986), 1-2.

Schmid, B F, "The Development of Electronic Commerce", *EM—Electronic Markets*, No. 9-10, (Oct. 1993), 2 pgs.

Schmitz, Tom, "California computer auctions—No Boon For Bargain Hunters", *Knight-Ridder/Tribune Business News, Dialog File 609 Accession No. 2096205*, (Sep. 13, 1993), 4 pgs.

Sharnoff, David, "Email Auction Server", http://www.idiom.com/~muir/auction.html, (1994), 1 Page.

Shulman, Richard, "VICS and quick response: priority issued for mass merchandisers.", *Supermarket Business*, v44, n10, (Oct. 1989), 13-14.

Siegmann, Ken, "Nowhere to go but up", *PC Week*; vol. 12(42), Ziff-Davis Publishing Company, (Oct. 23, 1995), 1-3.

Sirbu, Marvin A., "Internet Billing Service Design and Prototype Implementation", *IMA Intellectual Propert Project Proceedings*, 1(1), http://www.cni.org/docs/ima.ip-workshop/Sirbu.html, (1994), 1-19.

Sirbu, Marvin, et al., "Netbill: An Internet Commerce System Optimized for Network-Delivered Services", *IEEE Personal Communications*, 2, (Aug. 1995), 34-39.

Smith, Charles W, "Auctions, The Social Construction of Value", *University of California Press, Berkeley*, (1990), 123 pgs.

Smith, Rod, "DTN, Superior to Offer Daily Electronic Auction", *Feedstuffs, Business Report Section*, (Feb. 8, 1993), 1 Pages.

Smith, V., et al., "Competitive Market Insitutions: Double Auctions vs Sealed Bid-Offer Auctions", *The American Economic Review*, (Mar. 1982), vol. 72, No. 1.

Steiner, Ina, "From the Editor", *Auction Bytes newsletter, Autionbytes-Update*, No. 8, *ISSN 1529-6703*, (Feb. 20, 2000), 2 Pages.

Tenenbaum, J., "CommerceNet: spontaneous electronic commerce on the Internet", *Compcon '95. 'Technologies for the Information Superhighway', Digest of Papers.*, (1995), 38-43.

The Computer Museum Auction, "First-ever Internet Auction Produces Results for the Computer Museum", *Press release*, (duplicate releases), (Apr. 28, 1994), 4 pages.

Thomas, Charles, "Automotive News", *Copyright 1994 Crain Communications Inc.*, (Sep. 19, 1994), 11-12.

Tjostheim, Ingvar, "A case study of an on-line auction for the World Wide Web", *Norwegian Computing Center (NR)*, 1-10.

Toner, A., "Hogs Sold in High-Tech Market Bidders Linked Throught Satellite", *Omaha World-Herald*, (Sep. 11, 1994).

Turban, E, "Auctions and Bidding on the Internet: An Assessment", *Focus Theme*, 1-5.

Turoff, Murray, "An Electronic Information Marketplace", *North-Holland Computer Networks and ISDN Systems 9*, transferred in, (1985), 79-90.

Underwood, Chris, "A Mulitple Round Ascending Auction Process Suitable for the Disposal of Radio Spectrum in New Zealand", (Jan. 17, 1996).

Van Heck, E., et al., "Experiences with Electronic Auctions in the Dutch Flower Industry", *Focus Theme*, Erasmus University, The Netherlands, 6 pgs.

Varian, Hal, "Economic Mechanism Design for Computerized Agents", *USENIX Association Proceedings of the First USENIX Workshop of Electronic Commerce*, New York, New York Jul. 11-12, 1995, transferred in, 13-21.

Warbelow, A, et al., "Aucnet: TV Auction Network System", *Harvard Business School Case/Study*, HBVR#9-190-001, USA, (Jul. 1989), 1-15.

Weiss, Aaron, "The Virtual Flea Market", *Internet World*, (Jun. 1995), 54-57.

Williams, Arlington, et al., "Computerized Laboratory Exercises for Microeconomics Education: Three Applications Motivated by Experimental Economics", *The Journal of Economic Education*, vol. 24, No. 4, transferred in, (Fall 1993), 13 pages.

Zwass, V., "Electronic Commerce: Structures and Issues", *International Journal of Electronic Commerce, Fall 1996*, vol. 1, No. 1, (Fall 1996), 3-23.

"U.S. Appl. No. 11/963,094, Final Office Action mailed Dec. 27, 2010", 26 pgs.

"U.S. Appl. No. 11/963,130, Final Office Action mailed Dec. 27, 2010", 27 pgs.

"U.S. Appl. No. 09/504,261, Appeal Brief mailed Jun. 28, 2010", 25 pgs.

"U.S. Appl. No. 09/504,261, Decision on Pre-Appeal Brief Request mailed May 24, 2010", 2 pgs.

"U.S. Appl. No. 09/504,261, Examiner's Answer to Appeal Brief mailed Oct. 1, 2010", 8 pgs.

"U.S. Appl. No. 09/504,261, Reply Brief filed Dec. 1, 2010", 9 pgs.

"U.S. Appl. No. 09/706,849 , Appeal Brief filed Dec. 1, 2010", 34 pgs.

"U.S. Appl. No. 09/706,849, Advisory Action mailed Dec. 10, 2010", 2 pgs.

"U.S. Appl. No. 10/316,298, Notice of Allowance mailed Sep. 3, 2010", 4 pgs.

"U.S. Appl. No. 10/316,325, Appeal Brief filed Oct. 20, 2010", 31 pgs.

"U.S. Appl. No. 10/316,326, Appeal Brief filed Oct. 19, 2010", 24 pgs.

"U.S. Appl. No. 10/706,849, Advisory Action mailed Dec. 10, 2010", 3 pgs.

"U.S. Appl. No. 10/733,700, Notice of Allowance mailed Jun. 22, 2010", 15 pgs.

"U.S. Appl. No. 10/750,052, Decision on Pre-Appeal Brief Request mailed Dec. 4, 2007", 2 pgs.

"U.S. Appl. No. 10/750,052, Examiner's Answer to Appeal Brief mailed Feb. 12, 2008", 9 pgs.

"U.S. Appl. No. 10/750,052, Non-Final Office Action mailed Jul. 2, 2010", 8 pgs.

"U.S. Appl. No. 10/750,052, Notice of Allowance mailed Oct. 29, 2010", 22 pgs.

"U.S. Appl. No. 10/750,052, Response filed Oct. 4, 2010 to Non Final Office Action mailed Jul. 2, 2010", 9 pgs.

"U.S. Appl. No. 11/618,632, Decision on Pre-Appeal Brief Request mailed Apr. 13, 2010", 2 pgs.

"U.S. Appl. No. 11/618,632, Notice of Allowance mailed Aug. 6, 2010", 7 pgs.

"U.S. Appl. No. 11/648,213, Final Office Action mailed Nov. 3, 2010", 13 pgs.

"U.S. Appl. No. 11/648,213, Response filed Oct. 5, 2010 to Non Final Office Action mailed May 5, 2010", 11 pgs.

"U.S. Appl. No. 11/963,094, Response filed Nov. 12, 2010 to Non Final Office Action mailed May 13, 2010", 11 pgs.

"U.S. Appl. No. 11/963,130, Response filed Nov. 12, 2010 to Non Final Office Action mailed May 13, 2010", 11 pgs.

"European Application No. 04813781.4, Office Action mailed Jul. 29, 2010", 7 Pgs.

"European Application No. 04813781.4, Office Action Response Filed Dec. 7, 2010", 9 pgs.

"Taiwanese Application No. 93138325, Notice of Allowance mailed Jul. 23, 2010", 2 Pgs.

Orla, S, "Servicing rights, mortgage banks to be sold at live auctions", National Mortgage News NY, (Feb. 10, 1995).

"U.S. Appl. No. 09/706,849, Examiner's Answer ro Appeal Brief mailed Feb. 2, 2011", 13 pgs.

"U.S. Appl. No. 10/316,324, Notice of Allowance mailed Mar. 4, 2011", 9 pgs.

"U.S. Appl. No. 10/316,325, Examiner's Answer to Appeal Brief mailed Jan. 7, 2011", 21 pgs.

"U.S. Appl. No. 10/316,326, Examiner's Answer to Appeal Brief mailed Dec. 23, 2010", 9 pgs.

"U.S. Appl. No. 10/316,326, Reply Brief filed Feb. 23, 2011", 4 pgs.

"U.S. Appl. No. 11/648,213, Response filed Mar. 3, 2011 to Final Office Action mailed Nov. 3, 2010", 9 pgs.

"U.S. Appl. No. 11/963,130, Response filed Feb. 28, 2011 to Final Office Action mailed Dec. 27, 2010", 12 pgs.

"Ranch Auction Biddling Climbs", Journal Record. Oklahoma City, Okla, (Jun. 1992).

* cited by examiner

AUCTION WITH INTEREST RATE BIDDING

RELATED APPLICATIONS

The application is a continuation application which claims the priority benefit of U.S. application Ser. No. 10/733,700 filed Dec. 11, 2003, now U.S. Pat. No. 7,783,555 entitled "AUCTION WITH INTEREST RATE BIDDING" which is hereby incorporated by reference.

BACKGROUND OF THE INVENTION

1. Field of the Invention

Embodiments of the present invention generally relate to technical field of commerce automation and, in one exemplary embodiment, to auctioning with interest rate bidding.

2. Description of Related Art

The Internet and the World Wide Web ("Web") have changed the landscape of information delivery and affected numerous faculties of life, including electronic commerce and entertainment. One area that has benefited from this technological development is the ability for individuals to sell products over the Internet.

Auctions conducted across the Internet have become a very popular method of selling goods and services (items). In a typical ascending price auction, once a seller has submitted a request to sell an item, the item becomes available for bidding, with the bidding to close typically at some predetermined time (e.g., at noon, 3 days later). Potential buyers are able to view a description and possibly an image of the item, and submit one or more bids for the item. The potential buyer that submitted the highest bid on the item at the end of the auction wins the auction and is typically contractually obligated to purchase the item for the amount bid.

In a typical declining price auction, the price (e.g., dollar amount) for an item is lowered as potential buyers continue to bid on the item for a predetermined amount of time. The price is typically lowered in predetermined increments depending on certain events, such as passage of time or number of bids received. However, even with declining price auctions in which the dollar amount of the item is incrementally lowered, the goal of the seller remains the same, i.e., to sell the item for the highest price possible.

A number of technical challenges exist with respect to the automation of declining auctions between parties in a network-based commerce facility. For example, conventional declining auction technologies are at least limited in types of items that are offered for sale and types of compensation received for those items. Such technological challenges also limit the performance of declining auctions and confine them to only particular types and ways of trading, resulting further in lack of creativity and limited goals for trading on part of the participants (e.g., sellers and buyers).

BRIEF DESCRIPTION OF THE DRAWINGS

The appended claims set forth the embodiments of the present invention with particularity. The embodiments of the present invention, together with its advantages, may be best understood from the following detailed description taken in conjunction with the accompanying drawings of which:

DETAILED DESCRIPTION

Figure 1:
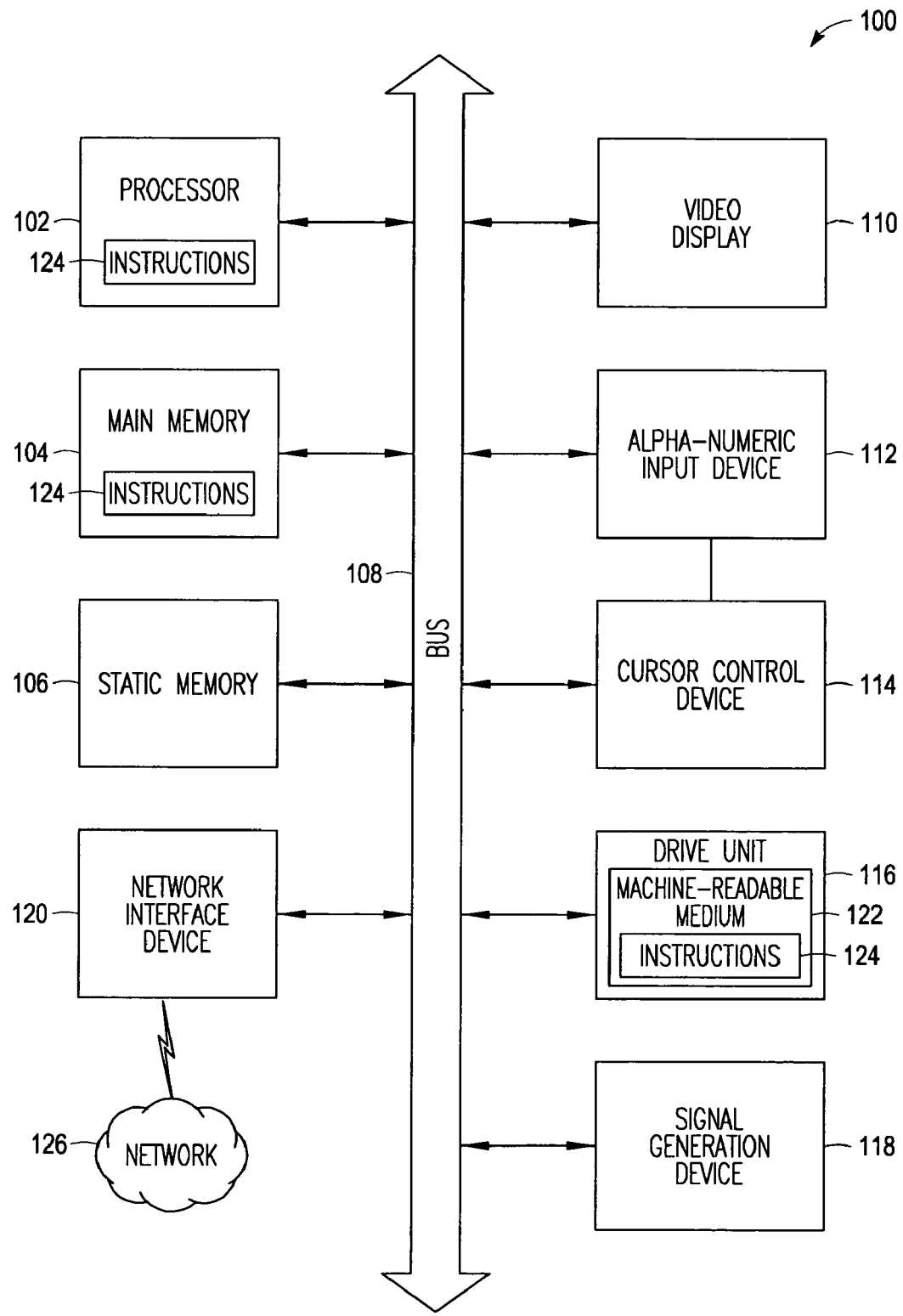
FIG. 1 is a block diagram illustrating an embodiment of a computer system.

A method, apparatus, and system are provided for declining auction with interest rate bidding. According to one embodiment, an interest rate may be set for a transacted financial instrument, and information regarding the financial instrument and an interest rate at which the financial instrument is offered are published via a computer network. Offers from respective bidders to transact the financial instrument may be received, via the computer network, being expressed as offered interest rates at which the bidders are willing to transact the financial instrument. On the termination of a bid receiving process, whether at least one of the offers satisfies transaction criteria, as defined by a seller of the financial instrument, may be determined. If it is determined that at least one of the offers satisfies the transaction criteria, then at least one of the offers may be identified as an accepted offer.

The information concerning the financial instrument may be published from a server computer to a client computer via the computer network. The information regarding the financial instrument may be received from the seller of the financial instrument. Furthermore, the offers may be received from the respective bidders at the server computer from respective client computers operated by the bidders.

According to one embodiment, the bid receiving process may include a declining auction including reducing the published interest rate at which the financial instrument may be offered for sale during the bid receiving process. The reducing of the published interest rate may be performed automatically by the server computer in response to, for example, bidding activity, lack of bidding activity, and/or receipt of a lower interest rate that is lower than the published interest rate. Furthermore, the published interest rate may be reduced to be equal to the lower interest rate.

Similarly, the bidding process may also include an ascending auction including increasing the published interest rate at which the financial instrument may be offered for sale during the bid receiving process. The ascension of the published may be performed automatically by the server computer in response to, for example, bidding activity, lack of bidding activity, and/or receipt of a higher interest rate that is higher than the published interest rate. Furthermore, the published interest rate may be increased to be equal to the higher interest rate.

The financial instrument may include one or more interest-paying (IP) financial instruments or one or more interest-receiving (IR) financial instruments. An IP financial instrument may refer to a financial instrument for which the seller pays interest to the buyer of the IP financial instrument, while an IR financial instrument may refer to a financial instrument for which the seller receives interest from the buyer of the IR financial instrument.

The interest rate may include a reserve interest rate having a maximum interest rate and/or a minimum interest rate. The maximum interest rate may refer to the highest interest rate that the seller is willing to pay to the buyer for an IP financial instrument, and the minimum interest rate may refer to the lowest interest rate that the seller is willing to accept from the buyer for an IR financial instrument.

In the following description, for purposes of explanation, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be evident, however, to one skilled in the art that the embodiments of the present invention may be practiced without these specific details, based on the disclosure provided. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

FIG. 1 is a block diagram illustrating an embodiment of a computer system. As illustrated, the computer system (system) 100 may include an exemplary machine within which a set of instructions, for causing the machine to perform any one or more of the methodologies discussed herein, may be executed. The system 100 may operate as a standalone device or may be connected (e.g., networked) to other machines or systems. In a networked deployment, the system 100 may operate in the capacity of a server or a client machine in server-client network environment, or as a peer machine in a peer-to-peer (or distributed) network environment. The system 100 may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single system 100 is illustrated, the term "machine" or "system" shall also be taken to include any collection of systems or machines that individually or jointly may execute a set (or multiple sets) of instructions to perform any one or more of the methodologies discussed herein.

The computer system 100 may include a processor 102 (e.g., a central processing unit (CPU) a graphics processing unit (GPU) or both), a main memory (memory) 104 and a static memory 106, which communicate with each other via a bus 108. The computer system 100 may further include a video display unit 310 (e.g., a liquid crystal display (LCD) or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker) and a network interface device 120 to connect the system 100 with other systems or machines via a network (e.g., the Internet) 126.

The processor 102 may include multiple processors including one or more multi-threaded processors having multiple threads or logical processors, and may be capable of processing multiple instruction sequences concurrently using its multiple threads. The processor 102 may further include one or more microprocessors, microcontrollers, field programmable gate arrays (FPGA), application specific integrated circuits (ASIC), central processing units (CPU), programmable logic devices (PLD), and similar devices that access instructions from system storage (e.g., main memory 104), decode them, and execute those instructions by performing arithmetic and logical operations. The processor 102 may also include one or more internal caches (not shown).

The bus 108 may also be known as the host bus or the front side bus, and may be used to couple the processors 302 with the system interface. Bus 108 may also be coupled with a control bus, an address bus, and/or a data bus (not shown). The control bus, the address bus, and the data bus may be multidrop bi-directional buses, e.g., connected to three or more bus agents, as opposed to a point-to-point bus, which may be connected only between two bus agents.

The memory 104 may include a dynamic storage device, a random access memory (RAM), or other storage device coupled with the bus 108 for storing information and instructions 124 to be executed by the processor 102. Memory 104 also may be used for storing temporary variables or other intermediate information during execution of instructions 124 by the processors 124. The static memory 106 may include a read only memory (ROM) and/or other static storage device coupled with the processor 102 via the bus 108 for storing static information and instructions for the processor 102.

Memory 104 may include a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 216 may also include one or more hard disks, floppy disks, ZIP disks, compact disks (e.g., CD-ROM), digital versatile/video disks (DVD), magnetic random access memory (MRAM) devices, and other system-readable media that store instructions and/or data. The memory 104 may store program modules such as routines, programs, objects, images, data structures, program data, and other program modules that perform particular tasks or implement particular abstract data types that facilitate system use.

The network interface device 120 may include a modem, a network interface card, or other well-known interface devices, such as those used for coupling with Ethernet, token ring, or other types of physical attachment for purposes of providing a communication link to support a local or wide area network 126, for example. Stated differently, the system 100 may be coupled with a number of clients and/or servers via a conventional network infrastructure 126, such as a company's Intranet and/or the Internet, for example.

The disk drive unit 116 may include a machine-readable medium 122 on which may be stored one or more sets of instructions (e.g., software 124) embodying any one or more of the methodologies or functions described herein. The software 124 may also reside, completely or at least partially, within the main memory 104 and/or within the processor 102 during execution thereof by the computer system 100, the main memory 104 and the processor 102 also constituting machine-readable media. The software 124 may further be transmitted or received over a network 126 via the network interface device 120.

While the machine-readable medium 122 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 100 and that causes the machine to perform any one or more of the methodologies of the present invention. The term "machine-readable medium" shall accordingly be taken to include, but not be limited to, solid-state memories, optical and magnetic media, and carrier wave signals.

It is appreciated that a lesser or more equipped computer system than the example described above may be desirable for certain implementations. Therefore, the configuration of system 100 may vary from implementation to implementation depending upon numerous factors, such as price constraints, performance requirements, technological improvements, and/or other circumstances.

It should be noted that, while the embodiments described herein may be performed under the control of a programmed processor, such as the processor 102, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 2:
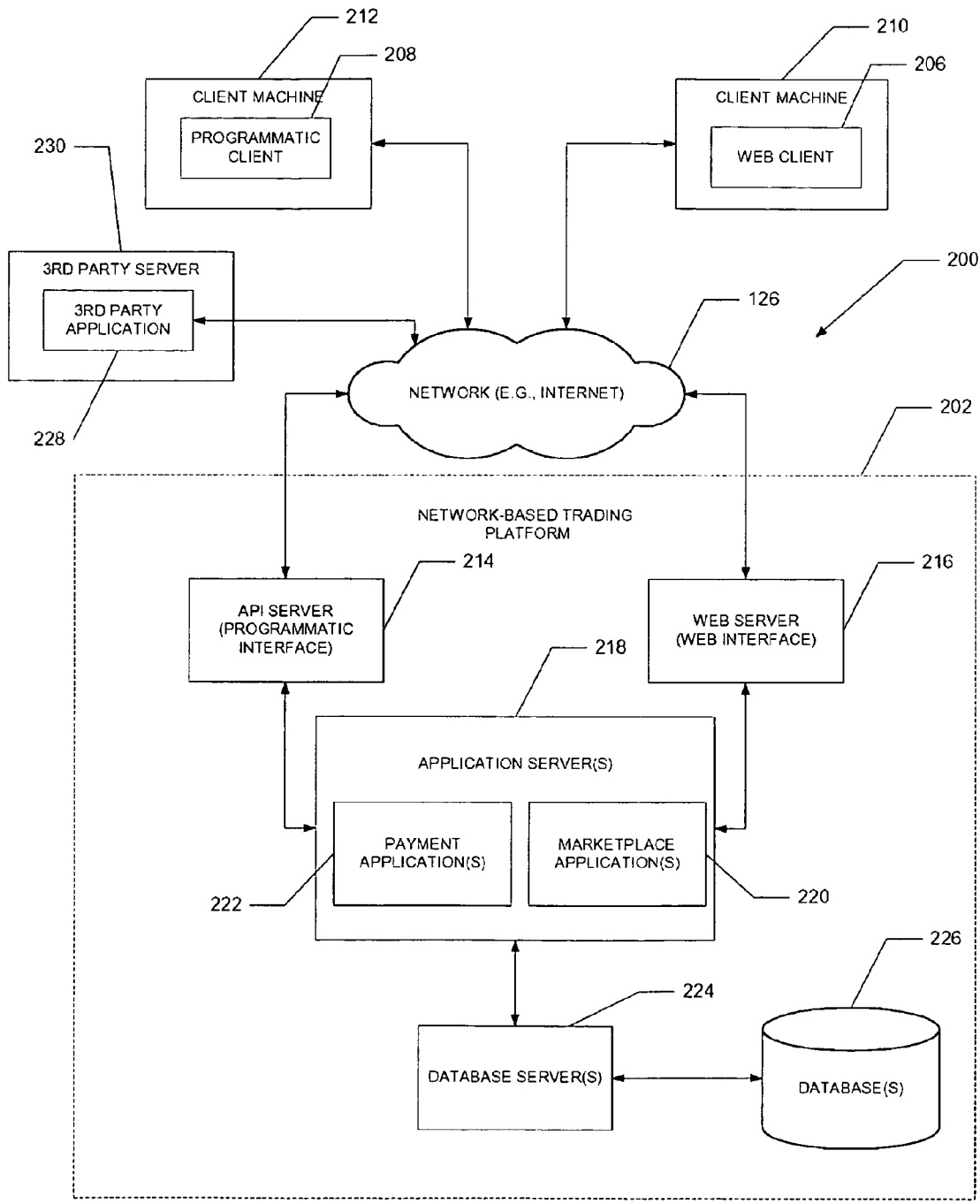
FIG. 2 is a block diagram illustrating an embodiment of a network.

FIG. 2 is a block diagram illustrating an embodiment of a network. As illustrated, the network or architecture (architecture) 200 may include a commerce platform, such as a network-based marketplace or trading platform 202, to provide server-side functionality, via a network 126 (e.g., the Internet) to one or more clients, such as client machines 210-212. As illustrated, for example, a web client 206 (e.g., a browser, such as the Internet Explorer or the Netscape Navigator), and a programmatic client 208 may execute on their respective client machines 210 and 212.

Turning specifically to the network-based marketplace 202, an application program interface (API) server 214 and a web server 216 may be coupled to, and provide programmatic and web interfaces respectively to, one or more application servers 218. The application servers 218 may host one or more marketplace applications 220 and payment applications 222. Furthermore, the application servers 28 may be coupled to one or more databases servers 224 to facilitate access to one or more databases 226.

The marketplace applications 220 may provide a number of marketplace functions and services to users that access the marketplace 202. The payment applications 222 likewise may provide a number of payment services and functions to users. The payment applications 222 may allow users to quantify for, and accumulate, value (e.g., in a commercial currency, such as the U.S. dollar, or a proprietary currency, such as "points") in accounts, and then to redeem the accumulated value for products (e.g., goods or services) that are made available via the marketplace applications 220. While the marketplace and payment applications 220 and 222, as illustrated, both form part of the network-based marketplace 202, it will be appreciated that, in alternative embodiments of the present invention, the payment applications 222 may form part of a payment service that is separate and distinct from the marketplace 202.

Further, while the architecture 200, as illustrated, may employ a client-server architecture, embodiments of the present invention are not limited to this architecture 200, and may equally well find application in a distributed, or peer-to-peer, architectures. The various marketplace and payment applications 220 and 222 may also be implemented as standalone software programs, which do not necessarily have networking capabilities.

The web client 206, it will be appreciated, may access the various marketplace and payment applications 220 and 222 via the web interface supported by the web server 216. Similarly, the programmatic client 206 may access the various services and functions provided by the marketplace and payment applications 220 and 222 via the programmatic interface provided by the API server 214. The programmatic client 208 may, for example, be a seller application (e.g., the TurboLister application developed by eBay Inc., of San Jose, Calif.) to enable sellers to author and manage listings on the marketplace 202 in an off-line manner, and to perform batch-mode communications between the programmatic client 208 and the network-based marketplace 202.

Figure 3:
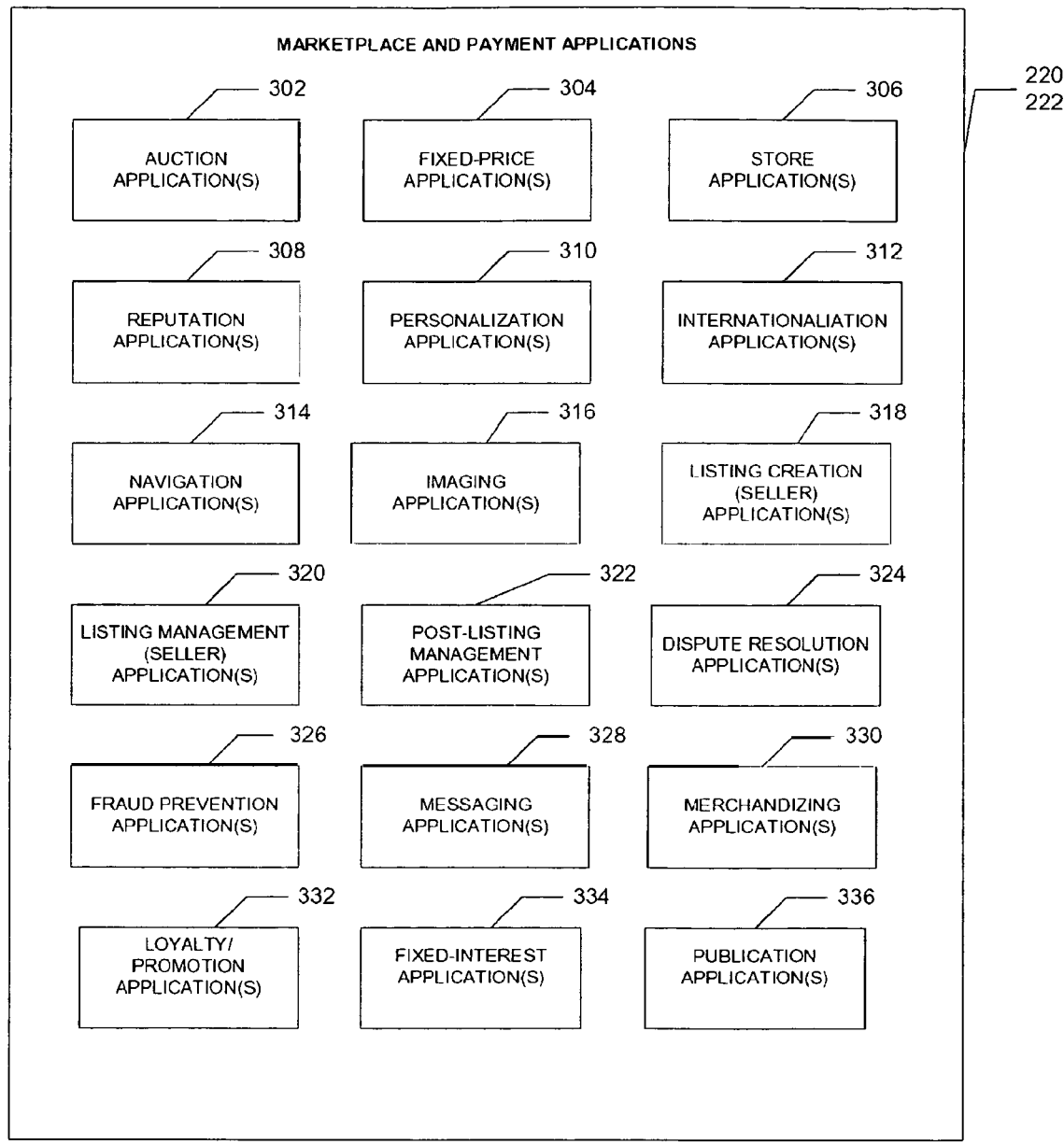
FIG. 3 is a block diagram illustrating an embodiment of marketplace and payment applications.

FIG. 3 is a block diagram illustrating an embodiment of marketplace and payment applications. Multiple marketplace and payment applications 220-222 may be provided as part of the network-based marketplace or trading platform 202, as illustrated and described with respect to FIG. 2. The network-based marketplace 202 may provide a number of listing and price-setting mechanisms whereby a seller may list goods or services for sale, a buyer may express interest in or indicate a desire to purchase such goods or services, and a price may be set for a transaction pertaining to the goods or services. To this end, the marketplace applications 220 may include one or more auction applications 302 to support auction-format listing and price setting mechanisms (e.g., English, Dutch, Vickrey, Chinese, Double, Ascending, Reverse and Declining auctions etc.). The various auction applications 302 may also provide a number of features in support of such auction-format listings, such as a reserve price feature whereby a seller may specify a reserve price in connection with a listing and a proxy-bidding feature whereby a bidder may invoke automated proxy bidding.

One or more of the auction applications 302 may include one or more declining auction applications and/or one or more ascending auction applications. A declining auction application may provide a dynamic processing mechanism for the trading of interest-paying financial instruments (e.g., bonds, notes, and certificate of deposits (CD)) for which a buyer receives interest from the seller. For interest-paying financial instruments, the price (in currency) may remain constant and the compensation for buying a particular financial instrument may include interest rate. For example, a financial institution or an individual (seller) may want to sell a $1000 bond to a buyer for an interest rate that is lower than the maximum interest rate that the seller is willing to pay to the buyer. Potential buyers may bid on the bond in terms of interest rates that they are willing to accept. The seller may then sell the bond to the buyer who bids the lowest interest rate. An ascending auction application may provide a dynamic processing mechanism for trading of interest-receiving financial instruments (e.g., mortgage loans, personal loans, and credit cards) for which a buyer pays interest to the seller.

One or more fixed-price applications 304 may support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format (or other dynamic pricing format) listing, and allow a buyer to purchase goods or services, which are also being offered for sale via an auction, for a fixed-price that is typically higher than the starting price of the auction.

Similarly, one or more fixed-interest applications 334 may support providing fixed-interest listing formats and buy-out listings. Using, again, the BIN technology as an example, a buyer may purchase a financial instrument, which may also be offered for sale via an auction, at a fixed interest rate. The fixed-interest rate may be higher or lower than the starting interest rate offered at the auction depending on the nature of the financial instrument. For example, a CD may be sold for a lower fixed-interest rate than the starting interest rate offered at the auction, while a credit card may be sold at a higher fixed-interest rate than the starting interest rate offered at the auction.

One or more publishing applications 336 may be used to publish the information relating to auctions, such as the declining price auction. For example, in an embodiment where the financial instruments are offered for sale over the Internet, the publishing applications 336 may format information about the financial instruments in a web page and provide that web page over the Internet to potential buyers. The publishing applications 336 may also update the current offer price (e.g., $100) or interest rate (e.g., 10%), as necessary, when the current offer price or interest rate is changed using the auction applications 302.

The store applications 306 may allow sellers to group their listings within a "virtual" store (e.g., a virtual bank), which may be branded and otherwise personalized by and for the sellers. Such a virtual store may also offer promotions, incentives and features that are specific and personalized to a relevant seller.

One or more reputation applications 308 may allow parties that transact utilizing the network-based marketplace 202 to establish, build and maintain reputations, which may be made available and published to potential trading partners. Consider that where, for example, the network-based marketplace 202 may support a person-to-person trading, users may have no history or other reference information whereby the trustworthiness and credibility of potential trading partners may be assessed. The reputation applications 308 may allow a user, for example through feedback provided by other transaction partners, to establish a reputation within the network-based marketplace 202 over time. Other potential trading partners may then reference such a reputation for the purposes of assessing credibility and trustworthiness.

The personalization applications 310 may allow users of the marketplace 202 to personalize various aspects of their interactions with the marketplace 202. For example a user may, utilizing an appropriate personalization application 310, may create a personalized reference page at which information regarding transactions to which the user is (or has been) a party may be viewed. Further, the personalization applications 310 may enable a user to personalize listings and other aspects of their interactions with the marketplace 202 and other parties.

The network-based marketplace 202 may support a number of marketplaces that are customized, for example, for specific geographic regions. For example, a version of the marketplace 202 may be customized for the United Kingdom, whereas another version of the marketplace 202 may be customized for the United States of America. Each of these versions may operate as an independent marketplace, or may be customized (or internationalized) presentations of a common underlying marketplace.

The navigation of the network based-marketplace 202 may be facilitated by one or more navigation applications 314. For example, a search application may enable key word searches of listings published via the marketplace 202. A browse application may allow users to browse various categories, catalogues, or inventory data structures according to which listings may be classified within the network-based marketplace 202. Various other navigation applications 314 may be provided to supplement the search and browsing applications.

In order to make listings, available via the network-based marketplace 202, as visually informing and attractive as possible, the marketplace applications 220 may include, according to one embodiment, one or more imaging applications 316 utilizing which users may upload images for inclusion within listings. The imaging applications 316 may also operate to incorporate images within viewed listings. The imaging applications 316 may also support one or more promotional features, such as image galleries that are presented to potential buyers. For example, sellers may pay an additional fee to have an image included within a gallery of images for promoted items.

One or more listing creation applications 318 may allow sellers conveniently to author listings pertaining to goods or services that they wish to transact via the network-based marketplace 202, and listing management applications 320 may allow sellers to manage such listings. Specifically, where a particular seller has authored and/or published a large number of listings, the management of such listings may present a challenge. The listing management applications 320 provide a number of features (e.g., auto-relisting, inventory level monitors, etc.) to assist the seller in managing such listings. One or more post-listing management applications 322 may also assist sellers with a number of activities that typically occur post-listing. For example, upon completion of an auction facilitated by one or more auction applications 302, a seller may wish to leave feedback regarding a particular buyer. To this end, a post-listing management application 322 may provide an interface to one or more reputation applications 308, so as to allow the seller conveniently to provide feedback regarding multiple buyers to the reputation applications 308. Goods and services may also include financial instruments, such as CDs, notes, credit cards, bank accounts, mortgages, bonds, etc.

The dispute resolution applications 324 provide mechanisms whereby disputes arising between transacting parties may be resolved. For example, the dispute resolution applications 324 may provide guided procedures whereby the parties are guided through a number of procedures in an attempt to settle a dispute. In the event that the dispute cannot be settled via the guided procedures, according to one embodiment, the dispute may be escalated to a third party mediator or arbitrator.

A number of fraud prevention applications 326 may implement various fraud detection and prevention mechanisms to reduce the occurrence of fraud within the network-based marketplace 202.

The messaging applications 328 may be responsible for the generation and delivery of messages to users of the network-based marketplace 202. Such messages, for example, may advise users regarding the status of listings at the network-based marketplace 202 (e.g., providing "outbid" notices to bidders during an auction process or to provide promotional and merchandising information to users).

The merchandising applications 330 may support various merchandising functions that are made available to sellers to enable sellers to increase sales via the network-based marketplace 202. The merchandising applications 330 may also operate the various merchandising features that may be invoked by sellers, and may monitor and track the success of merchandising strategies employed by sellers.

The network-based marketplace 202 itself, or one or more parties that transact via the network-based marketplace 202 may operate loyalty programs that are supported by one or more loyalty/promotions applications 332. For example, a buyer may earn loyalty or promotions points for each transaction established and/or concluded with a particular seller, and may be offered a reward for which accumulated loyalty points can be redeemed.

Figure 4:
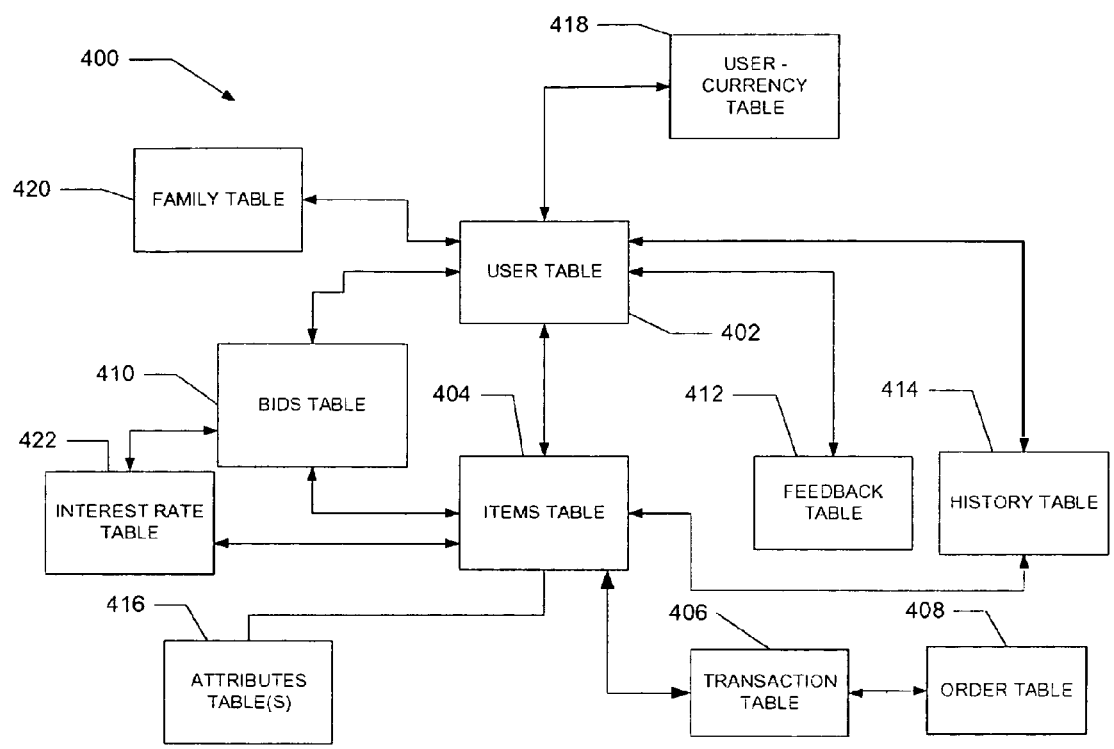
FIG. 4 is a block diagram illustrating an embodiment of a high-level entity-relationship.

FIG. 4 is a block diagram illustrating an embodiment of a high-level entity-relationship. As illustrated, according to one embodiment, various tables 400 may be maintained within the databases 226 (see FIG. 2), and utilized by and support the marketplace and payment applications 220 and 222 (see FIGS. 2 and 3). A user table 402 may contain a record for each registered user of the network-based marketplace 202, and may include identifier, address and financial instrument information pertaining to each such registered user. A user may, it will be appreciated, operate as a seller, a buyer, or both, within the network-based marketplace 202. In one exemplary embodiment of the present invention, a buyer may be a user that has accumulated value (e.g., commercial or proprietary currency or interest rate), and is then able to exchange the accumulated value for items (e.g., goods, services, and financial instruments) that are offered for sale by the network-based marketplace 202.

The tables 400 may also include an items table 404 in which may be maintained item records for the items that are available to be, or have been, transacted via the network-based marketplace 202. Each item record within the items table 404 may furthermore be linked to one or more user records within the user table 402, so as to associate a seller and one or more actual or potential buyers with each item record.

A transaction table 406 may contain a record for each transaction (e.g., a purchase transaction) pertaining to items for which records may exist within the items table 404. An order table 408 may be populated with order records, each order record may be associated with an order. Each order, in turn, may be with respect to one or more transactions for which records may exist within the transactions table 406.

The bid records maintained within a bids table 410 may each relate to a bid received at the network-based marketplace 202 in connection with an auction-format listing supported by an auction application 302. An interest rate table 422 may contain information relating to interest rates at they relate to the items (e.g., financial instruments) on sale. For example, the interest rate table 422 may include the start offer interest rate, increments at which the interest rate may be declined, and the reserve interest rate (e.g. maximum and minimum interest rates) corresponding to each of the items. The interest rate table 422 may include overlapping information from other tables, such as the bids table 410, items table 404, and history table 414. A history table 414 may maintain a history of transactions to which a user has been a party.

One or more attributes tables 416 may record attribute information pertaining to items for which records may exist within the items table 404. A feedback table 412 may be utilized by one or more reputation applications 308 to construct and maintain reputation information concerning users. Considering only a single example of such an attribute, the attributes tables 416 may indicate a currency or interest rate attribute associated with a particular item, identifying the currency or interest rate for the relevant item as specified by a seller. The tables 400 illustrated here, and the like, may be included in the databases 226 and/or may be, directly or indirectly, coupled with each other. Furthermore, depending on various embodiments of the present invention, not all the tables 400 may be needed and conversely, additional tables, not illustrated here, may be added, as necessitated.

Figure 5:
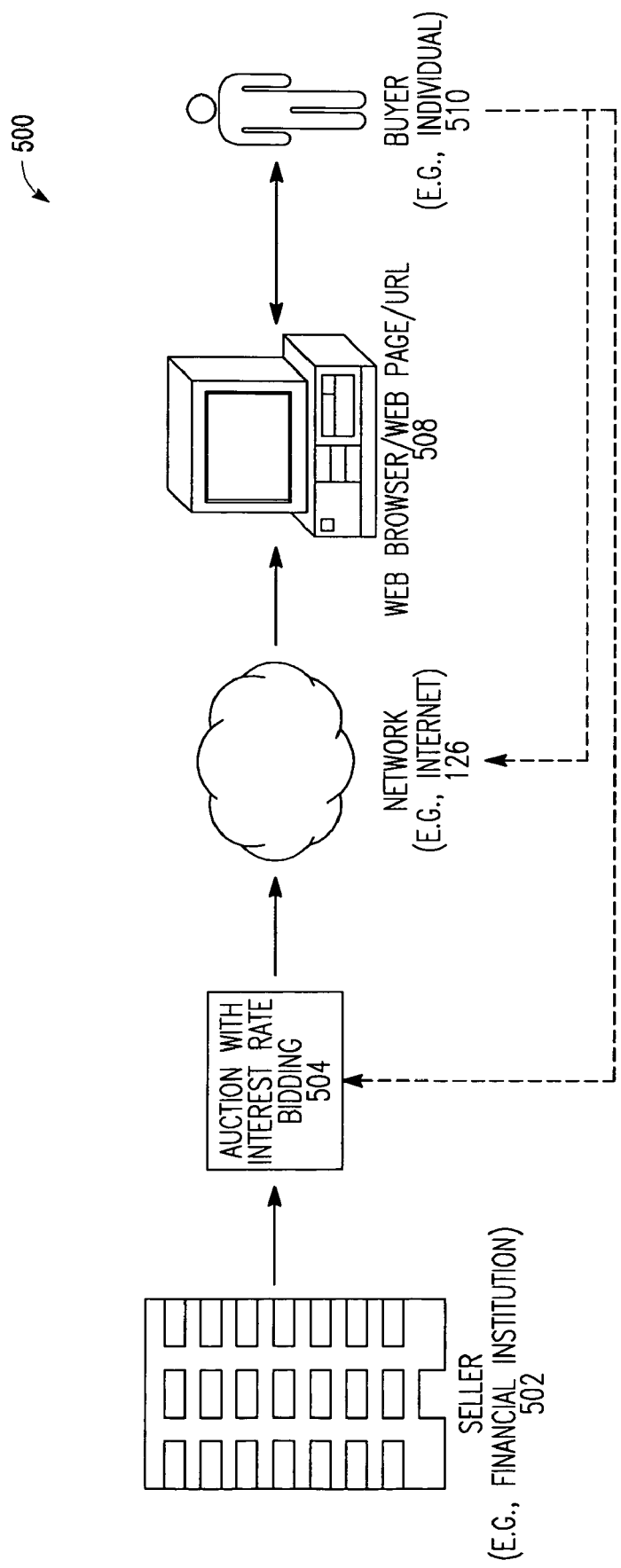
FIG. 5 is a block diagram illustrating an embodiment of an auction with interest rate bidding.

FIG. 5 is a block diagram illustrating an embodiment of an auction with interest rate bidding. According to one embodiment, one or more sellers 502 including financial institutions (e.g., banks, lenders, mutual fund companies, investment companies, and brokers) may publish one or more items including financial instruments (e.g., bonds, certificate of deposits (CDs), savings and money market accounts, home mortgages, automobile loans, personal loans, student loans, and credit cards) for sale using an ascending auction or a declining auction with interest rate bidding 504 over a network 126 (e.g., Internet). The publication of the items for sale may be performed using a website for the users 510 to access via a web browser (e.g., Internet Explorer and Netscape Navigator) using a Uniform Resource Locator (URL) 508 (e.g., http://www.financialinstrumentsauction.com).

The seller 502 may publish, for example, a $1000 bond in a declining auction with an initial offer interest rate (initial interest rate) of, for example, 10%. The price of the bond (e.g., $1000), however, may remain constant regardless of the initial interest rate and subsequent biddings of the interest rate by the buyer 510, and the final interest rate at which the bond may be sold. The initial interest rate may be set by the seller 502 for the users 510 to start bidding on the item. The initial interest rate may be set automatically depending on various factors, such as item types, history of the time, time allowed for the declining auction, market rates, and reserve interest rate.

The reserve interest rate for the item may refer to the maximum interest rate and/or minimum interest rate for the item as set by the seller depending on the type of item. For example, the reserve interest rate for a bond may be the maximum interest rate (e.g., 6%) that the seller 502 is willing to pay; on the other hand, the reserve interest rate for a mortgage loan may be the minimum interest rate (e.g., 5%) that the seller 502 is willing to accept. Stated differently, for interest-paying items (e.g., items on which the seller 502 is expected to pay interest (e.g., bonds, CDs, savings and money market accounts)), the seller 502 may set a maximum interest rate that the seller 502 is willing to pay and above which the seller 502 may not sell the item. Furthermore, for interest-paying items, a declining auction may be used.

For interest-receiving items (e.g., items on which the buyer 510 is expected to pay interest (e.g., home mortgages, automobile loans, personal loans, student loans, and credit cards)), the seller 502 may set a minimum interest rate that the seller 502 is willing to accept and under which the seller 502 may not sell the item. The determination of the reserve interest rate of items may also depend on other factors, such as item types, history of the time, time allowed for the declining auction, market rates, and initial offer interest rate (initial interest rate). In contrast with the interest-paying items, for interest-receiving items, an ascending auction may be used.

The buyers 510 may continue to bid on the items until a bid is accepted or a triggering event, such as end of the predetermined time period for the auction, occurs. The initial interest rate may be reduced by the seller, or automatically reduced responsive to bid values received from potential buyers. The lowering of the initial interest rate, however, may be performed in predetermined increments or according to the bids received. For example, the initial interest rate of 10% for the bond may be reduced by 1% after every 2 hours of declining auction until it reaches 0.01%. The initial interest rate may be reduced according to the bids received; for example, a bid of 9.5% may reduce the initial interest rate to 9.5% and later, a bid of 8.75% may reduce the initial interest rate to 8.75%. The interest rate (initial or reserve interest rate) may not reach 0% and the minimum increment for reducing or bidding the interest rate may be 0.01%. In an ascending auction, the seller may accept the bid with the highest interest rate that is also greater than the minimum interest rate. In a declining auction, the seller may accept the bid with the lowest interest rate that is also lower than the maximum interest rate.

The seller 502 may not be limited to a financial institution and may include individuals and other parties, and the buyer 510 may not be limited to an individual and may include financial institutions and other parties. Also, it is anticipated, the seller 502 and buyer 510 may include any combination of individuals, parties, and financial institutions just as the items for sale may include any variety and combination of financial instruments.

Figure 6:
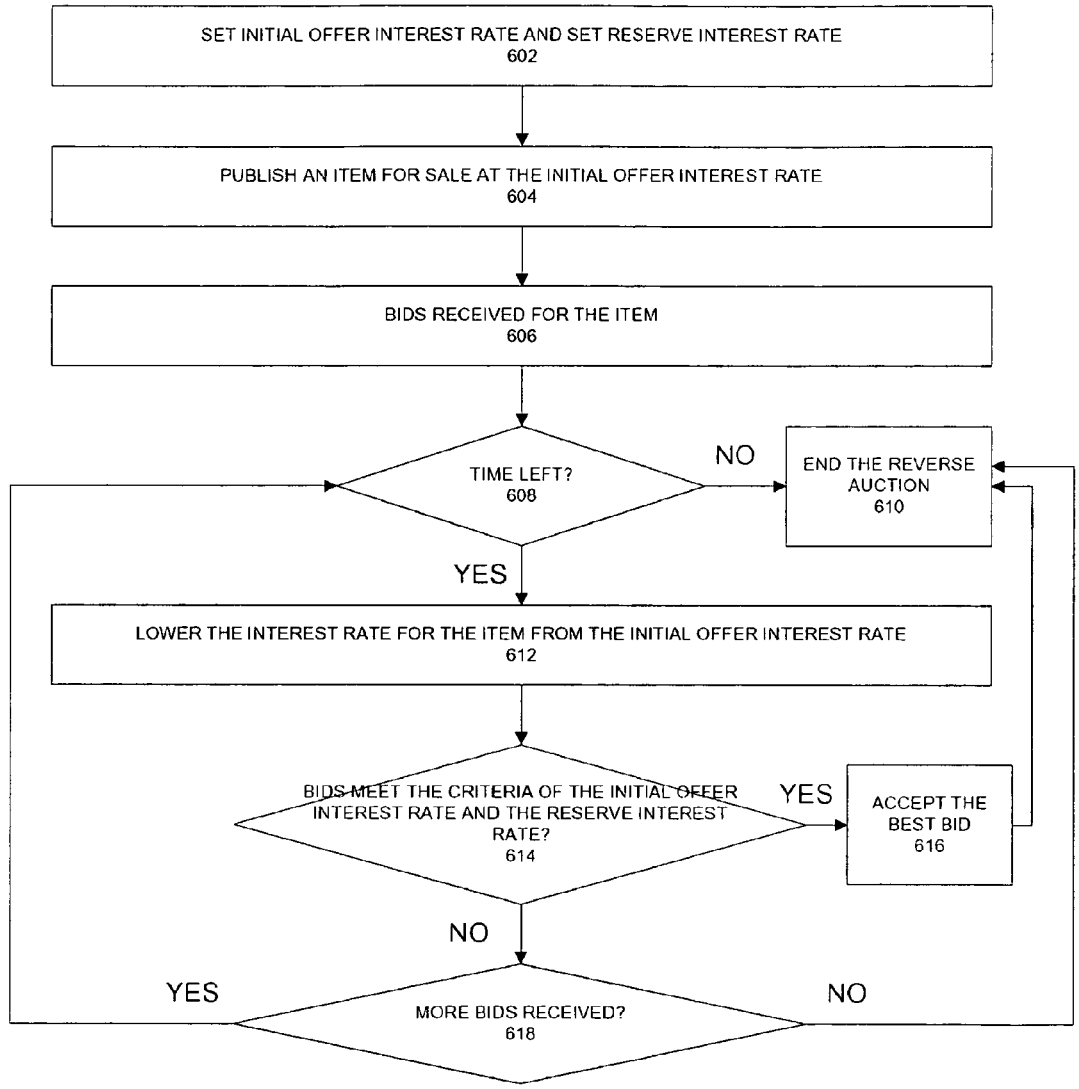
FIG. 6 is a flow diagram illustrating an embodiment of a process for an auction with interest rate bidding.

FIG. 6 is a flow diagram illustrating an embodiment of a process of an auction with interest rate bidding. According to one embodiment, an initial offer interest rate (initial interest rate) and a reserve interest rate (e.g., maximum interest rate or minimum interest rate) may be set for an item for sale on the declining auction by a seller at processing block 602. The item may then be published along with the initial interest rate by the seller over a network (e.g., Internet) for users to access at processing block 604. The users may access the publication of the item using a web page via an Internet browser using a Uniform Resource Locator (URL). The users may also use the web page to bid on the item and such bids are received at processing block 606. The bidding by the users may be performed using various interest rates (e.g., 6.25%, 4.00%, and 2.90%). The interest rates bid by the users may be entered as free-form numbers, or may be interest rates that are presented to the user in a drop-down menu, from which the user may then select an interest rate.

A predetermined time period may be set for auctioning of the item. The predetermined time period may be set at the beginning of the auction, or may be set during the auction if, for example, the item is not very popular with the users. The time period may not be set and the item may be on the auction until it is sold. In an embodiment where the time period is set for the auction of the item, at decision block 608, the remaining time in the auction is determined. If no time is left, the auction may end at processing block 610. However, if there is some time left, the auction may continue with the lowering of the initial interest rate according to predetermined increments, or according to the received bids at processing block 612.

At decision block 614, according to one embodiment, the received bids are evaluated for satisfying the initial interest rate and reserve interest rate criteria. If any of the bids meet the criteria of initial interest rate and reserve interest rate as set forth by, for example, the seller, the best of those bids may be accepted at processing block 616. For example, in case of an interest-paying item (e.g., bond), the bid with the lowest interest rate (e.g., closest to zero) may be accepted using a declining auction, and in case of an interest-receiving item (e.g., home mortgage loan), the bid with the highest interest rate may be accepted using an ascending auction. In the case of multiple items for sale, multiple bids may be received corresponding to each of the multiple items. Furthermore, if only one bid satisfies the criteria of the initial interest rate and the reserve interest rate, that one bid may be accepted.

If none of the bids received satisfy the criteria of the initial interest rate and the reserve interest rate, whether more bids are received may be determined at decision block 618. If the more bids are received, the auction using interest rate bidding may end at processing block 610.

Figure 7:
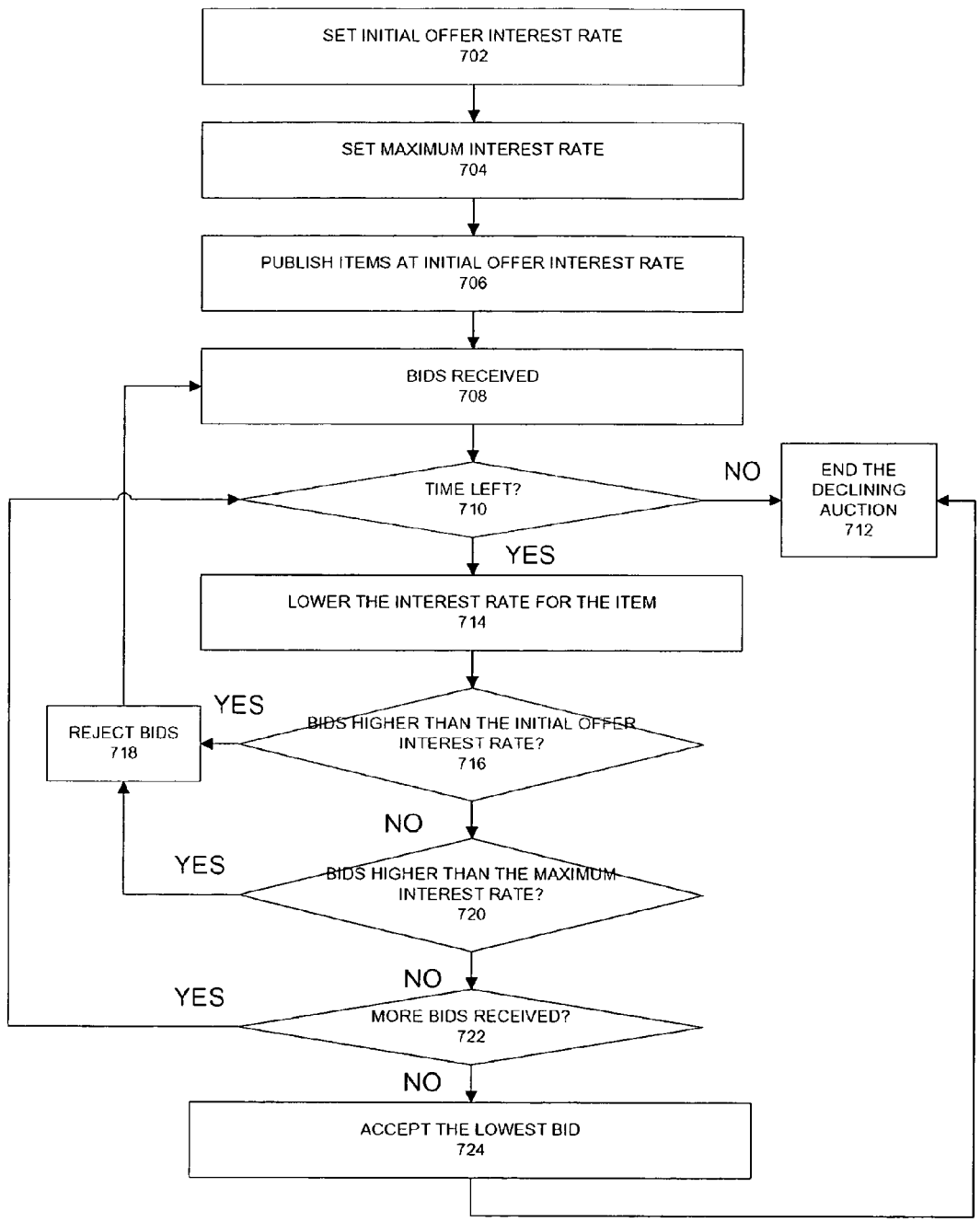
FIG. 7 is a flow diagram illustrating an embodiment of a process for a declining auction with interest rate bidding.

FIG. 7 is a flow diagram illustrating an embodiment of a process of a declining auction with interest rate bidding. According to one embodiment, the seller may set or assign an initial offer interest rate (initial interest rate) to an item to sell the item using a declining auction with interest rate bidding at processing block 702. The item may include an interest-paying (IP) item including a financial instrument on which the seller of the financial instrument is expected to pay interest to the buyer. Examples of IP items may include bonds, certificates of deposit (CDs), interest-bearing checking accounts, savings accounts, money market accounts, savings plans, and the like. Given that the seller is expected to pay the interest, according to one embodiment, the seller may set or assign a reserve interest rate including a maximum interest rate (maximum rate) to the IP item at processing block 704. The maximum rate may refer to the maximum rate of interest that the seller is willing to pay on the IP item. Stated differently, the seller may reject any bids that are above the maximum rate and may accept the lowest bid, such as the one closest to 0%.

The seller may publish the IP item at the initial interest rate for the buyers to bid at processing block 706. The initial interest rate for the IP item may be published, but the maximum rate may remain confidential. For example, the seller may publish a $1000 bond for sale at the initial interest rate of 10% to start bidding, but may keep confidential the maximum rate of 6% that the seller is willing to pay. At the processing block 708, according to one embodiment, the buyers may begin to bid on the IP item. Using the published initial interest rate of 10%, the buyers may start bidding at 10% and may bid as low as 0.01%, in minimum increments of 0.01%. For example, one or more buyers may bid 8.25%, 6.23%, 3.90%, and 2.76% for the bond, during which the price of the bond (e.g., $1000) may not change. One buyer may place one or more bids.

A predetermined time period may be assigned to the declining auction, which means the declining auction may automatically expire after a certain time period has ended and no acceptable bid has yet been received for the IP item. According to another embodiment, no predetermined time period may be assigned to the declining auction, and the auction may remain open until the item is sold or other triggering event has occurred, such as change in financial markets, political situation, or laws concerning the IP item or declining auction, and the like. At decision block 710, time left of the predetermined time period is determined. If the time period has expired, the declining auction may expire at processing block 712. If the time period has not yet expired, the declining auction may continue with the lowering of the initial interest rate at processing block 714.

The initial interest rate for the IP item may be lowered in various increments based on various factors, such as time or bids received. For example, the initial interest rate of 10% for the bond may be reduced by an increment of 0.1% after every hour, reducing the rate of 10% to 9.70% after three hours. On the other hand, the initial interest rate may be reduced according to the bids received. For example, the initial interest rate of 10% may be reduced from the highest to the lowest bid received, such as from 10% to 8.25% to 6.23% to 3.90% and then to 2.76%. If a lower bid (e.g., 3.90%) is received before a higher bid (e.g., 6.23%), the initial interest rate may remain at 3.90%, and may not be increased to 6.23%.

The bids received may then be compared to the initial interest rate to determine whether any of the bids qualify for further consideration at decision block 716. If the bid rate (e.g., 12.5%) is higher than the initial interest rate (e.g., 10%), the bid for the IP item (e.g., bond) may be rejected at processing block 718. Bids with interest rates lower than the initial interest rate may then be compared with the maximum rate to determine whether any of those bids qualify for further consideration at decision block 720. If the bid rate (e.g., 8.25% and 6.23%) is higher than the maximum rate (e.g., 6%), the bid for the IP item (e.g., bond) may be rejected at processing block 718, and the declining auction continues with receiving bids at processing block 708.

Before accepting any of the bids (e.g., 3.90% and 2.76%) having lower interest rate than the maximum rate (e.g., 6%) for the IP item (e.g., bond), whether more bids have been received is determined at decision block 722. If additional bids have been received, the process of evaluating and analyzing those and other bids may continue at decision block 710. If no more bids received, the lowest bid (e.g., 2.76%) may be accepted at processing block 724. With the acceptance of the lowest (or best) bid, the declining auction with interest rate bidding may end at processing block 712.

Accepting the lowest bid may mean the seller may pay the accepted bid interest rate to the buyer of the IP item. Continuing with the bond example, the seller may pay 2.76% to the buyer for the $1000 bond that the buyer purchased with the accepted bid.

Figure 8:
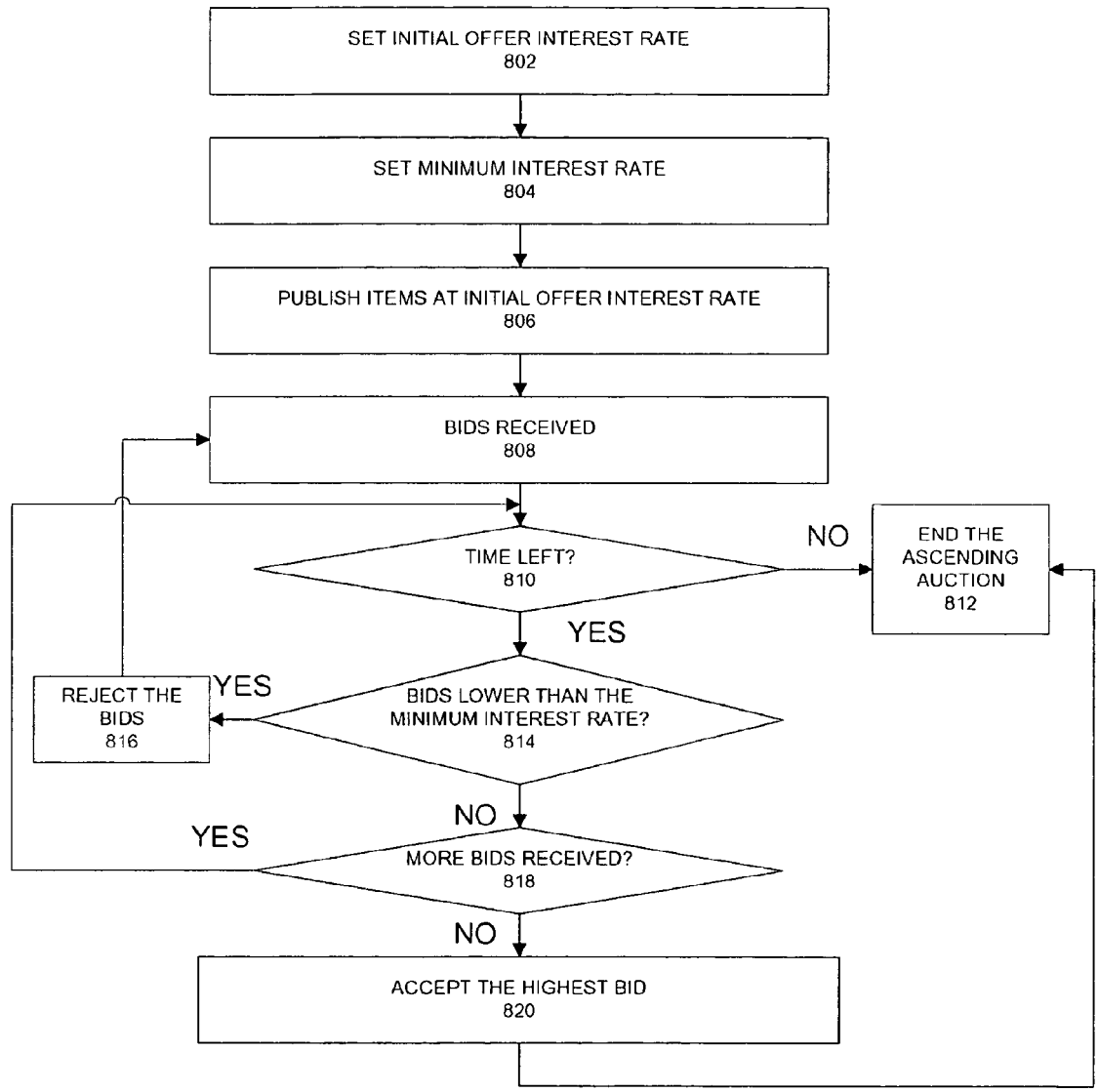
FIG. 8 is a flow diagram illustrating an embodiment of a process for an ascending auction with interest rate bidding.

FIG. 8 is a flow diagram m illustrating an embodiment of a process of an ascending auction with interest rate bidding. According to one embodiment, the seller may set or assign an initial offer interest rate (initial interest rate) to an item to sell the item using an ascending auction with interest rate bidding at processing block 802. The item may include an interest-receiving (IR) item including a financial instrument on which the seller of the financial instrument is expected to receive interest from the buyer. Examples of IR items may include home mortgages, automobile loans, personal loans, student loans, credit cards, and the like. Given that the seller is expected to receive the interest, the seller may set or assign a reserve interest rate including a minimum interest rate (minimum rate) to the IR item at processing block 804. The minimum rate may refer to the minimum rate of interest that the seller is willing to receive on the IR item. Stated differently, the seller may reject any bids that are below the minimum rate.

The seller may publish the IR item at the initial interest rate for the buyers to bid at processing block 806. The initial interest rate for the IR item may be published, but the minimum rate may remain confidential. For example, the seller may publish a credit card for sale at the initial interest rate of 7% to start bidding, but may keep confidential the minimum rate of 10% that the seller is willing to accept. At the processing block 808, the buyers may begin to bid on the IR item. Using the published initial interest rate of 7%, the buyers may start bidding at 7% and may bid in minimum increments of 0.01%. For example, one or more buyers may bid 18.25%, 16.23%, 8.90%, and 7.76% for the credit card. Also, one buyer may place one or more bids.

A predetermined time period may be assigned to the ascending auction, which means the ascending auction may automatically expire after a certain time period has ended and no acceptable bid has yet been received for the IR item. According to another embodiment, no predetermined time period may be assigned to the declining auction, and the auction may remain open until the item is sold or other triggering event has occurred, such as change in financial markets, political situation, or laws concerning the IR item or ascending auctions, and the like. At decision block 810, time left of the predetermined time period is determined. If the time period has expired, the ascending auction may expire at processing block 812. If the time period has not yet expired, the ascending auction may continue.

The seller, according to one embodiment, may have the option of lowering the minimum rate, in various increments, depending on the bids received to accommodate more bids or, according to another embodiment, may choose not to lower the minimum rate and reject all bids that are for interest rate lower than the minimum rate. The bids received with interest rates lower than the initial interest rate may then be compared with the minimum rate to determine whether any of those bids qualify for further consideration at decision block 814. If the bid interest rate (e.g., 8.90% and 7.76%) is lower than the minimum rate (e.g., 10%), and even though it is higher than the initial rate (e.g., 7%), such bid for the IR item (e.g., credit card) may be rejected at processing block 816, and the ascending auction continues with the receiving of bids at processing block 808.

Before accepting any of the bids (e.g., 18.25% and 16.23%) having higher interest rate than the minimum rate (e.g., 10%) for the IR item (e.g., credit cards), whether more bids have been received is determined at decision block 818. If additional bids have been received, the process of evaluating and analyzing those and other bids may continue at decision block 810. If no more bids are received, the highest bid (e.g., 18.25%) may be accepted at processing block 820. With the acceptance of the highest (or best) bid, the ascending auction with interest rate bidding may end at processing block 812.

Accepting the highest bid may mean that the seller has received and accepted a bid interest rate from a buyer of the IR item that satisfies the seller's criteria for selling the IR item. Continuing with the credit card example, the buyer may pay 18.25% to the seller for, for example, carrying a balance on the credit card that the buyer purchased with the accepted bid.

Figure 9:
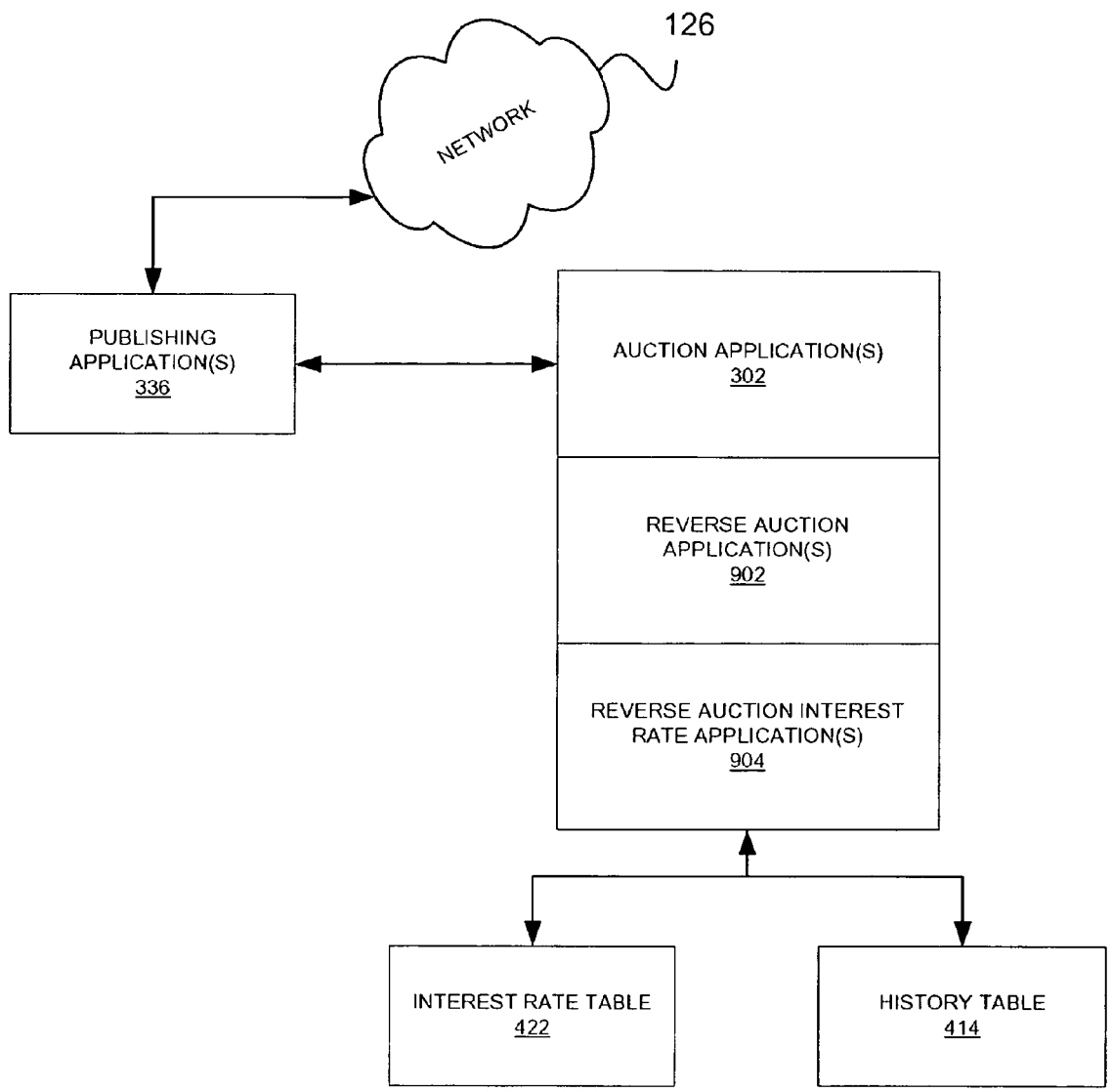
FIG. 9 is a block diagram illustrating an embodiment of auction architecture.

FIG. 9 is a block diagram illustrating an embodiment of auction architecture. According to one embodiment, the auction architecture 900, as illustrate here, may include any variety and combinations of one or more client computers and/or one or more server computers directly or indirectly coupled with each other over a network 126 (e.g., the Internet). The auction architecture 900 may also include any number of components and/or elements also directly or indirectly connected with each other and with the one or more client computers and/or one or more server computers over the network 126.

According to one embodiment, an auction, including an ascending auction or a declining auction, may be performed using one or more auction applications 302 as illustrated and described with reference to FIG. 3. The one or more auction applications 302 may include one or more ascending an/or declining auction applications 902 to perform various embodiments of the auction. The one or more ascending and/or declining auction applications 902 may further include one or more ascending and/or declining auction interest rate applications 904 to perform various embodiments of the ascending and declining auctions including auctions using interest rate biddings. The various auction applications 302, 902-904 may be used to facilitate a processor, such as the processor 102 of FIG. 1, to perform the embodiments of the present application.

The auction applications 302, 902-904 may, directly or indirectly, interface or be coupled with one or more databases, such as the databases 226 of FIG. 2. The one or more databases 226 may include an interest rate table 422 and a history table 414. The interest rate table 422 may be used to store information relating to interest rates of a particular item. The information may include various interest rates associated with a number of items, such as initial offer interest rate, reserve interest rate including maximum interest rate and/or minimum interest rate, and interest rates bid by various buyers or a particular item, and the like. Various items may include various financial instruments including interest-receiving (IR) items and interest-paying (IP) items. IR items may refer to those financial instruments on which the seller is expected to receive interest from the buyer upon purchase of an IR item. IP items may refer to those financial instruments on which the seller is expected to pay interest to the buyer upon purchase of an IP item.

The history table 414 may include historical information about various items, as described above, that have been sold or offered for sale using the declining auction with interest rate bidding. Furthermore, the history table 414 may contain information regarding various registered users of the declining auction. The registered risers may or may not have participated in a declining auction and/or purchased an item. For example, a declining auction interest rate application 904 may query the interest rate table 422 and the history table 414 to determine whether items similar to the one currently on sale have been sold and the interest rate at which the they were sold using the declining auction with interest rate bidding. Such information may be used by the declining auction interest rate application 904 to, for example, either automatically list the initial interest rate and/or reserve interest rate for the item or allow the seller to extract the collected information to determine the initial interest rate and/or reserve interest rate.

The publishing application 336 may perform embodiments including processes relating to publishing the information with regard to the declining auction. For example, in an embodiment where an item may be offered for sale over the Internet 126, the publishing application 336 may format information about the item on a web page and have that web page available over the Internet 126 to potential buyers. Furthermore, the publishing application 336 may also update the current initial interest rate as the current initial interest rate may change by the declining auction applications 902-904.

For simplicity, a single auction is used and illustrated as an example. However, embodiments of the present invention provide for a plurality of auctions, including ascending auctions and declining auctions, to take place sequentially and/or simultaneously. A plurality of auctions may be conducted on the same or different server computers and even on different processors within the same server computer. Furthermore, a single auction or a plurality of auctions may be performed in the same or different processors, and threads, etc. Moreover, any combination of software, hardware, firmware, etc., may be used to perform various embodiments of the present invention. Embodiments of the present invention may also provide for programming the functionality required for performing the various embodiments using any programming technology, paradigm, and/or language that exist today or may be developed in the future, including, but not limited to parallel programming, object-oriented technology, distributed processing, multi-processing, Java, C, C++, and assembly language, and the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method, comprising:

receiving a starting interest rate and a maximum interest rate for an interest-paying (IP) item at a computer, the maximum interest rate being identified by a seller as a highest interest rate that the seller pays a buyer, the receiving done at least in part using one or more processors that are included in one or more computer systems that respectively include a set of instructions causing the one or more computers systems to perform the receiving;

publishing the IP item for sale at the starting interest rate at a first computer, the publishing done at least in part using one or more processors;

initiating a declining auction and receiving at least one bid in the declining auction for the IP item;

terminating the declining auction based on a predetermined period of time, the predetermined period of time being identified based on a selling price of a plurality of IP items in other declining auctions;

identifying one or more bids that respectively include an interest rate that is lower than the maximum interest rate; and selecting a lowest interest rate bid from the one or more bids as a winning bid.

2. The method of claim 1, further comprising receiving the one or more bids at the first computer.

3. The method of claim 1, wherein the IP item comprises one or more financial instruments.

4. The method of claim 3, wherein the one or more financial instruments comprise at least one of a bond, a certificate of deposit, an interest-bearing checking account, a savings account, and a money market account.

5. The method of claim 1, wherein the predetermined period of time is modified after the auction has been initiated.

6. The method of claim 5, wherein the predetermined period of time is modified based on a number of buyers reviewing the IP item, a number of bids received for the IP item, and a current interest rate.

7. The method of claim 1, wherein the receiving of the starting interest rate comprises receiving the interest rate from the seller of the IP item.

8. The method of claim 1, wherein the receiving of the starting interest rate comprises automatically setting the interest rate based at least one of historical information associated with other IP items, buyer input, and the maximum interest rate for the interest-paying IP item.

9. The method of claim 1, further comprising communicating a web page to a client computer, the web page including a drop down menu from which an interest rate for a bid may be selected.

10. A system, comprising:
at least one processor; and
a declining auction application that is executable by the at least one processor to receive a starting interest rate and a maximum interest rate for an interest-paying (IP) item at a computer, the maximum interest rate being identified by a seller as a highest interest rate that the seller pays a buyer, the receiving done at least in part using one or more processors, the declining auction application is further executable by the at least one processor to publish the IP item for sale at the starting interest rate at a first computer, the publishing done at least in part using one or more processors, the declining auction application is further executable by the at least one processor to initiate a declining auction and receiving at least one bid in the declining auction for the IP item, the declining auction application is further executable by the at least one processor to terminate the declining auction based on a predetermined period of time, the predetermined period of time being identified based on a selling price of a plurality of IP items in other declining auctions, the declining auction application is further executable by the at least one processor to identify one or more bids that respectively includes an interest rate that is lower than the maximum interest rate and to select a lowest interest rate bid from the one or more bids as a winning bid.

11. The system of claim 10, wherein the declining auction application is further executable by the at least one processor to receive the one or more bids at the first computer.

12. The system of claim 10, wherein the IP item comprises one or more financial instruments.

13. The system of claim 12 wherein the one or more financial instruments comprise at least one of a bond, a certificate of deposit, an interest-bearing checking account, a savings account, and a money market account.

14. The system of claim 10, wherein the predetermined period of time is modified after the auction has been initiated.

15. The system of claim 14, wherein the predetermined period of time is modified based on a number of buyers reviewing the IP item, a number of bids received for the IP item, and a current interest rate.

16. The system of claim 10, wherein the declining auction application is further executable by the at least one processor to receive the interest rate from the seller of the IP item.

17. The system of claim 10, wherein the declining auction application is further executable by the at least one processor to automatically set the interest rate based at least one of historical information associated with other IP items, buyer input, and the maximum interest rate for the interest-paying IP item.

18. The system of claim 10, wherein the declining auction application is further executable by the at least one processor to communicate a web page to a first client computer, the web page including a drop down menu from which an interest rate for a bid may be selected.

19. A machine readable medium having stored thereon instructions that when executed by a machine cause the machine to perform the method including:

receiving a starting interest rate and a maximum interest rate for an interest-paying (IP) item at a computer, the maximum interest rate being identified by a seller as a highest interest rate that the seller pays a buyer, the receiving done at least in part using one or more processors;

publishing the IP item for sale at the starting interest rate at a first computer, the publishing done at least in part using one or more processors; initiating a declining auction and receiving at least one bid in the declining auction for the IP item;

terminating the declining auction based on a predetermined period of time, the predetermined period of time being identified based on a selling price of a plurality of IP items in other declining auctions;

identifying one or more bids that respectively include an interest rate that is lower than the maximum interest rate; and selecting a lowest interest rate bid from the one or more bids as a winning bid.

* * * * *